United States Patent
Hensley et al.

(10) Patent No.: US 9,689,157 B1
(45) Date of Patent: Jun. 27, 2017

(54) FIRE AND WATER RESISTANT EXPANSION AND SEISMIC JOINT SYSTEM

(71) Applicant: EMSEAL JOINT SYSTEMS, LTD., Westborough, MA (US)

(72) Inventors: Lester Hensley, Westborough, MA (US); Bill Witherspoon, Guelph (CA)

(73) Assignee: EMSEAL JOINT SYSTEMS LTD., Westborough, MA (US)

( * ) Notice: Subject to any disclaimer, the term of this patent is extended or adjusted under 35 U.S.C. 154(b) by 0 days.

(21) Appl. No.: 14/455,398

(22) Filed: Aug. 8, 2014

Related U.S. Application Data

(63) Continuation of application No. 13/723,605, filed on Dec. 21, 2012, now Pat. No. 8,813,449, which is a continuation of application No. 12/730,354, filed on Mar. 24, 2010, now Pat. No. 8,341,908.

(60) Provisional application No. 61/162,820, filed on Mar. 24, 2009.

(51) Int. Cl.

| | |
|---|---|
| E04B 1/68 | (2006.01) |
| C09K 21/00 | (2006.01) |
| E04B 1/94 | (2006.01) |
| E04B 1/98 | (2006.01) |
| E04B 1/66 | (2006.01) |

(52) U.S. Cl.
CPC ............... *E04B 1/68* (2013.01); *C09K 21/00* (2013.01); *E04B 1/66* (2013.01); *E04B 1/94* (2013.01); *E04B 1/98* (2013.01)

(58) Field of Classification Search
CPC .............................. E04B 1/6812; E04B 1/948
USPC .... 52/395, 396.01, 465, 466, 467, 468, 232, 52/317, 393, 396.03, 396.04, 396.07, 52/396.06, 586.1, 586.2; 404/47, 68
See application file for complete search history.

(56) References Cited

U.S. PATENT DOCUMENTS

| | | | |
|---|---|---|---|
| 517,701 | A | 4/1894 | Knower |
| 945,914 | A | 4/1909 | Colwell |
| 1,357,713 | A | 11/1920 | Lane |
| 1,371,727 | A | 3/1921 | Blickle |
| 1,428,881 | A | 9/1922 | Dyar |
| 1,691,402 | A | 11/1928 | Oden |

(Continued)

FOREIGN PATENT DOCUMENTS

| | | |
|---|---|---|
| CA | 1280007 | 4/1989 |
| CA | 1334268 | 8/1989 |

(Continued)

OTHER PUBLICATIONS

Schul International Co., LLC., Firejoint 2FR-H, Fire Rated Expansion Joint 2 Hour Fire Rated, labeled Copyright 2012, pp. 1-2.

(Continued)

*Primary Examiner* — William Gilbert
(74) *Attorney, Agent, or Firm* — MKG LLC

(57) ABSTRACT

A fire and water resistant expansion joint system has a cover plate; a spline attached to the cover plate along a first edge of the spline; and two portions of foam, each portion being located on an opposing face of the spline. The foam has a fire-retardant material infused therein. The spline depends from the cover plate and is positioned in a gap between substantially coplanar substrates such that the cover plate overlies the gap. Each portion of the foam is compressed between a respective face of the spline and a face of one of the coplanar substrates.

18 Claims, 5 Drawing Sheets

(56) References Cited

U.S. PATENT DOCUMENTS

| | | |
|---|---|---|
| 1,716,994 A | 6/1929 | Wehrle |
| 1,809,613 A | 6/1931 | Walker |
| 2,010,569 A | 8/1935 | Sitzler |
| 2,016,858 A | 10/1935 | Hall |
| 2,035,476 A | 3/1936 | Herwood |
| 2,152,189 A | 4/1936 | Henderson |
| 2,069,899 A | 2/1937 | Older |
| 2,190,532 A | 2/1940 | Lukomski |
| 2,240,787 A | 5/1941 | Kinzer |
| 2,271,180 A | 1/1942 | Brugger |
| 2,277,286 A | 3/1943 | Bechtner |
| 2,544,532 A | 3/1951 | Hill |
| 2,701,155 A | 2/1955 | Estel, Jr. |
| 2,776,865 A | 1/1957 | Anderson |
| 2,828,235 A | 3/1958 | Holland et al. |
| 2,954,592 A | 10/1960 | Parsons |
| 2,995,056 A | 10/1960 | Knox |
| 3,024,504 A | 3/1962 | Miller |
| 3,080,540 A | 3/1963 | McFarland |
| 3,111,069 A | 11/1963 | Farbish |
| 3,124,047 A | 3/1964 | Graham |
| 3,172,237 A | 3/1965 | Bradley |
| 3,194,846 A | 7/1965 | Blaga |
| 3,232,786 A | 2/1966 | Kellman |
| 3,244,130 A | 4/1966 | Hipple, Jr. |
| 3,245,328 A | 4/1966 | Fassbinder |
| 3,255,680 A | 6/1966 | Cooper et al. |
| 3,262,894 A | 7/1966 | Green |
| 3,289,374 A | 12/1966 | Metz |
| 3,298,653 A | 1/1967 | Omholt |
| 3,300,913 A | 1/1967 | Patry et al. |
| 3,302,690 A | 2/1967 | Hurd |
| 3,335,647 A | 8/1967 | Thorp, Jr. |
| 3,344,011 A | 9/1967 | Goozner |
| 3,352,217 A | 11/1967 | Peters et al. |
| 3,355,846 A | 12/1967 | Tillson |
| 3,363,383 A | 1/1968 | Barge |
| 3,371,456 A | 3/1968 | Balzer et al. |
| 3,372,521 A | 3/1968 | Thom |
| 3,378,958 A | 4/1968 | Parks et al. |
| 3,394,639 A | 7/1968 | Viehmann |
| 3,410,037 A | 11/1968 | Empson et al. |
| 3,435,574 A | 4/1969 | Hallock |
| 3,447,430 A | 6/1969 | Gausepohl |
| 3,470,662 A | 10/1969 | Kellman |
| 3,482,492 A | 12/1969 | Bowman |
| 3,543,459 A | 12/1970 | Mills |
| 3,551,009 A | 12/1970 | Cammuso et al. |
| 3,575,372 A | 4/1971 | Emberson |
| 3,582,095 A | 6/1971 | Bogaert et al. |
| 3,603,048 A | 9/1971 | Hadfield |
| 3,604,322 A | 9/1971 | Koster |
| 3,606,826 A | 9/1971 | Bowman |
| 3,629,986 A | 12/1971 | Klittich |
| 3,643,388 A | 2/1972 | Parr et al. |
| 3,659,390 A | 5/1972 | Balzer et al. |
| 3,670,470 A | 6/1972 | Thom |
| 3,672,707 A | 6/1972 | Russo et al. |
| 3,677,145 A | 7/1972 | Wattiez |
| 3,694,976 A | 10/1972 | Warshaw |
| 3,712,188 A | 1/1973 | Worson |
| 3,720,142 A | 3/1973 | Pare |
| 3,736,713 A | 6/1973 | Flachbarth et al. |
| 3,742,669 A | 7/1973 | Mansfeld |
| 3,745,726 A | 7/1973 | Thom |
| 3,750,359 A | 8/1973 | Balzer et al. |
| 3,760,544 A | 9/1973 | Hawes et al. |
| 3,797,188 A | 3/1974 | Mansfeld |
| 3,849,958 A | 11/1974 | Balzer et al. |
| 3,856,839 A | 12/1974 | Smith et al. |
| 3,871,787 A | 3/1975 | Stegmeier |
| 3,880,539 A | 4/1975 | Brown |
| 3,883,475 A | 5/1975 | Racky et al. |
| 3,896,511 A | 7/1975 | Cuschera |
| 3,907,443 A | 9/1975 | McLean |
| 3,911,635 A | 10/1975 | Traupe |
| 3,934,905 A | 1/1976 | Lockard |
| 3,944,704 A | 3/1976 | Dirks |
| 3,951,562 A | 4/1976 | Fyfe |
| 3,956,557 A | 5/1976 | Hurst |
| 3,974,609 A | 8/1976 | Attaway |
| 4,007,994 A | 2/1977 | Brown |
| 4,018,017 A | 4/1977 | Schoop |
| 4,018,539 A | 4/1977 | Puccio |
| 4,022,538 A | 5/1977 | Watson et al. |
| 4,030,156 A | 6/1977 | Raymond |
| 4,055,925 A | 11/1977 | Wasserman et al. |
| 4,058,947 A | 11/1977 | Earle et al. |
| 4,066,578 A | 1/1978 | Murch et al. |
| 4,129,967 A | 12/1978 | Barlow |
| 4,132,491 A | 1/1979 | Scheffel |
| 4,134,875 A | 1/1979 | Tapia |
| 4,140,419 A | 2/1979 | Puccio |
| 4,143,088 A | 3/1979 | Favre et al. |
| 4,146,939 A | 4/1979 | Izzi |
| 4,174,420 A | 11/1979 | Anolick et al. |
| 4,181,711 A | 1/1980 | Ohashi et al. |
| 4,204,856 A | 5/1980 | Yigdall et al. |
| 4,221,502 A | 9/1980 | Tanikawa |
| 4,224,374 A | 9/1980 | Priest |
| 4,237,182 A | 12/1980 | Fulmer et al. |
| 4,245,925 A | 1/1981 | Pyle |
| 4,246,313 A | 1/1981 | Stengle, Jr. |
| 4,258,606 A | 3/1981 | Wilson |
| 4,270,318 A | 6/1981 | Carroll et al. |
| 4,271,650 A | 6/1981 | Lynn-Jones |
| 4,288,559 A | 9/1981 | Illger et al. |
| 4,290,249 A | 9/1981 | Mass |
| 4,290,713 A | 9/1981 | Brown et al. |
| 4,295,311 A | 10/1981 | Dahlberg |
| 4,305,680 A | 12/1981 | Rauchfuss, Jr. |
| 4,320,611 A | 3/1982 | Freeman |
| 4,359,847 A | 11/1982 | Schukolinski |
| 4,362,428 A | 12/1982 | Kerschner |
| 4,367,976 A | 1/1983 | Bowman |
| 4,374,207 A | 2/1983 | Stone et al. |
| 4,374,442 A | 2/1983 | Hein et al. |
| 4,401,716 A | 8/1983 | Tschudin-Mahrer |
| 4,424,956 A | 1/1984 | Grant et al. |
| 4,431,691 A | 2/1984 | Greenlee |
| 4,432,465 A | 2/1984 | Wuertz |
| 4,433,732 A | 2/1984 | Licht et al. |
| 4,447,172 A | 5/1984 | Galbreath |
| 4,453,360 A | 6/1984 | Barenberg |
| 4,455,396 A | 6/1984 | Al-Tabaqchall et al. |
| 4,473,015 A | 9/1984 | Hounsel |
| 4,486,994 A | 12/1984 | Fisher et al. |
| 4,494,762 A | 1/1985 | Geipel |
| 4,533,278 A | 8/1985 | Corsover et al. |
| 4,558,875 A | 12/1985 | Yamaji et al. |
| 4,564,550 A | 1/1986 | Tschudin-Mahrer |
| 4,566,242 A | 1/1986 | Dunsworth |
| 4,576,841 A | 3/1986 | Lingemann |
| 4,589,242 A | 5/1986 | Moulinie et al. |
| 4,615,411 A | 10/1986 | Breitscheidel et al. |
| 4,620,330 A | 11/1986 | Izzi, Sr. |
| 4,620,407 A | 11/1986 | Schmid |
| 4,622,251 A | 11/1986 | Gibb |
| 4,637,085 A | 1/1987 | Hartkorn |
| 4,687,829 A | 8/1987 | Chaffee et al. |
| 4,693,652 A | 9/1987 | Sweeney |
| 4,711,928 A | 12/1987 | Lee et al. |
| 4,717,050 A | 1/1988 | Wright |
| 4,745,711 A | 5/1988 | Box |
| 4,751,024 A | 6/1988 | Shu et al. |
| 4,756,945 A | 7/1988 | Gibb |
| 4,767,655 A | 8/1988 | Tschudin-Mahrer |
| 4,773,791 A | 9/1988 | Hartkorn |
| 4,780,571 A | 10/1988 | Huang |
| 4,781,003 A | 11/1988 | Rizza |
| 4,784,516 A | 11/1988 | Cox |
| 4,791,773 A | 12/1988 | Taylor |
| 4,807,843 A | 2/1989 | Courtois et al. |
| 4,815,247 A | 3/1989 | Nicholas |

(56) References Cited

U.S. PATENT DOCUMENTS

| | | |
|---|---|---|
| 4,824,283 A | 4/1989 | Belangie |
| 4,835,130 A | 5/1989 | Box |
| 4,839,223 A | 6/1989 | Tschudin-Mahrer |
| 4,848,044 A | 7/1989 | LaRoche et al. |
| 4,849,223 A | 7/1989 | Pratt et al. |
| 4,866,898 A | 9/1989 | LaRoche et al. |
| 4,879,771 A | 11/1989 | Piskula |
| 4,882,890 A | 11/1989 | Rizza |
| 4,885,885 A | 12/1989 | Gottschling |
| 4,893,448 A | 1/1990 | McCormick |
| 4,901,488 A | 2/1990 | Murota et al. |
| 4,911,585 A | 3/1990 | Vidal et al. |
| 4,916,878 A | 4/1990 | Nicholas |
| 4,920,725 A | 5/1990 | Gore |
| 4,927,291 A | 5/1990 | Belangie |
| 4,932,183 A | 6/1990 | Coulston |
| 4,942,710 A | 7/1990 | Rumsey |
| 4,952,615 A | 8/1990 | Welna |
| 4,957,798 A | 9/1990 | Bogdany |
| 4,965,976 A | 10/1990 | Riddle et al. |
| 4,977,018 A | 12/1990 | Irrgeher et al. |
| 4,992,481 A * | 2/1991 | von Bonin et al. ............ 521/54 |
| 5,007,765 A | 4/1991 | Dietlein et al. |
| 5,013,377 A | 5/1991 | Lafond |
| 5,024,554 A | 6/1991 | Benneyworth et al. |
| 5,026,609 A | 6/1991 | Jacob et al. |
| 5,035,097 A | 7/1991 | Cornwall |
| 5,053,442 A | 10/1991 | Chu et al. |
| 5,060,439 A | 10/1991 | Clements et al. |
| 5,071,282 A | 12/1991 | Brown |
| 5,072,557 A | 12/1991 | Naka et al. |
| 5,082,394 A | 1/1992 | George |
| 5,094,057 A | 3/1992 | Morris |
| 5,115,603 A | 5/1992 | Blair |
| 5,120,584 A | 6/1992 | Ohlenforst et al. |
| 5,121,579 A | 6/1992 | Hamar et al. |
| 5,129,754 A | 7/1992 | Brower |
| 5,130,176 A | 7/1992 | Baerveldt |
| 5,137,937 A | 8/1992 | Huggard et al. |
| 5,140,797 A | 8/1992 | Gohlke et al. |
| 5,168,683 A | 12/1992 | Sansom et al. |
| 5,173,515 A | 12/1992 | von Bonin et al. |
| 5,190,395 A | 3/1993 | Cathey et al. |
| 5,209,034 A | 5/1993 | Box et al. |
| 5,213,441 A | 5/1993 | Baerveldt |
| 5,222,339 A | 6/1993 | Hendrickson et al. |
| 5,249,404 A | 10/1993 | Leek et al. |
| 5,270,091 A | 12/1993 | Krysiak et al. |
| 5,297,372 A | 3/1994 | Nicholas |
| 5,327,693 A | 7/1994 | Schmid |
| 5,335,466 A | 8/1994 | Langohr |
| 5,338,130 A | 8/1994 | Baerveldt |
| 5,354,072 A | 10/1994 | Nicholson |
| 5,365,713 A | 11/1994 | Nicholas et al. |
| 5,367,850 A | 11/1994 | Nicholas |
| 5,380,116 A | 1/1995 | Colonias |
| 5,436,040 A | 7/1995 | Lafond |
| 5,441,779 A | 8/1995 | Lafond |
| 5,443,871 A | 8/1995 | Lafond |
| 5,450,806 A | 9/1995 | Jean |
| 5,456,050 A | 10/1995 | Ward |
| 5,472,558 A | 12/1995 | Lafond |
| 5,479,745 A | 1/1996 | Kawai et al. |
| 5,485,710 A | 1/1996 | Lafond |
| 5,489,164 A | 2/1996 | Tusch et al. |
| 5,491,953 A | 2/1996 | Lafond |
| 5,498,451 A | 3/1996 | Lafond |
| 5,501,045 A | 3/1996 | Wexler |
| 5,508,321 A | 4/1996 | Brebner |
| 5,528,867 A | 6/1996 | Thompson |
| RE35,291 E | 7/1996 | Lafond |
| 5,572,920 A | 11/1996 | Kennedy et al. |
| 5,607,253 A | 3/1997 | Almstrom |
| 5,611,181 A | 3/1997 | Shreiner et al. |
| 5,616,415 A | 4/1997 | Lafond |
| 5,628,857 A | 5/1997 | Baerveldt |
| 5,635,019 A | 6/1997 | Lafond |
| 5,649,784 A | 7/1997 | Ricaud et al. |
| 5,650,029 A | 7/1997 | Lafond |
| 5,656,358 A | 8/1997 | Lafond |
| 5,658,645 A | 8/1997 | Lafond |
| 5,664,906 A | 9/1997 | Baker et al. |
| 5,680,738 A | 10/1997 | Allen et al. |
| 5,686,174 A | 11/1997 | Irrgeher |
| 5,691,045 A | 11/1997 | Lafond |
| 5,744,199 A | 4/1998 | Joffre et al. |
| 5,759,665 A | 6/1998 | Lafond |
| 5,762,738 A | 6/1998 | Lafond |
| 5,765,332 A | 6/1998 | Landin et al. |
| 5,773,135 A | 6/1998 | Lafond |
| 5,791,111 A | 8/1998 | Beenders |
| 5,806,272 A | 9/1998 | Lafond |
| 5,813,191 A | 9/1998 | Gallagher |
| 5,830,319 A | 11/1998 | Landin |
| 5,851,609 A | 12/1998 | Baratuci et al. |
| 5,875,598 A | 3/1999 | Batten et al. |
| 5,876,554 A | 3/1999 | Lafond |
| 5,878,448 A | 3/1999 | Molter |
| 5,887,400 A | 3/1999 | Bratek et al. |
| 5,888,341 A | 3/1999 | Lafond |
| 5,935,695 A | 8/1999 | Baerveldt |
| 5,957,619 A | 9/1999 | Kinoshita et al. |
| 5,974,750 A | 11/1999 | Landin |
| 5,975,181 A | 11/1999 | Lafond |
| 6,001,453 A | 12/1999 | Lafond |
| 6,014,848 A | 1/2000 | Hillburn, Jr. |
| 6,035,536 A | 3/2000 | Dewberry |
| 6,035,587 A | 3/2000 | Dressler |
| 6,035,602 A | 3/2000 | Lafond |
| 6,039,503 A | 3/2000 | Cathey |
| D422,884 S | 4/2000 | Lafond |
| 6,088,972 A | 7/2000 | Johanneck |
| 6,102,407 A | 8/2000 | Moriya et al. |
| 6,115,980 A | 9/2000 | Knak et al. |
| 6,115,989 A | 9/2000 | Boone et al. |
| 6,128,874 A | 10/2000 | Olson et al. |
| 6,131,352 A | 10/2000 | Barnes et al. |
| 6,131,364 A | 10/2000 | Peterson |
| 6,131,368 A | 10/2000 | Tramposch et al. |
| 6,138,427 A | 10/2000 | Houghton |
| 6,148,890 A | 11/2000 | Lafond |
| 6,158,915 A | 12/2000 | Kise |
| 6,189,573 B1 | 2/2001 | Ziehm |
| 6,192,652 B1 | 2/2001 | Goer et al. |
| 6,207,085 B1 | 3/2001 | Ackerman |
| 6,207,089 B1 | 3/2001 | Chuang |
| 6,219,982 B1 | 4/2001 | Eyring |
| 6,237,303 B1 | 5/2001 | Allen et al. |
| 6,250,358 B1 | 6/2001 | Lafond |
| 6,253,514 B1 | 7/2001 | Jobe et al. |
| 6,329,030 B1 | 12/2001 | Lafond |
| 6,350,373 B1 | 2/2002 | Sondrup |
| 6,351,923 B1 | 3/2002 | Peterson |
| 6,355,328 B1 | 3/2002 | Baratuci et al. |
| 6,368,670 B1 | 4/2002 | Frost et al. |
| 6,419,237 B1 | 7/2002 | More |
| 6,439,817 B1 | 8/2002 | Reed |
| 6,443,495 B1 | 9/2002 | Harmeling |
| 6,460,214 B1 | 10/2002 | Chang |
| 6,491,468 B1 | 12/2002 | Hagen |
| 6,499,265 B2 | 12/2002 | Shreiner |
| 6,532,708 B1 | 3/2003 | Baerveldt |
| 6,544,445 B1 | 4/2003 | Graf et al. |
| 6,552,098 B1 | 4/2003 | Bosch et al. |
| 6,574,930 B2 | 6/2003 | Kiser |
| 6,581,341 B1 | 6/2003 | Baratuci et al. |
| 6,598,364 B1 | 7/2003 | Pelles |
| 6,665,995 B2 | 12/2003 | Deane |
| 6,666,618 B1 | 12/2003 | Anaya et al. |
| 6,685,196 B1 | 2/2004 | Baerveldt |
| 6,820,382 B1 | 11/2004 | Chambers et al. |
| 6,860,074 B2 | 3/2005 | Stanchfield |
| 6,862,863 B2 | 3/2005 | McCorkle et al. |
| 6,877,292 B2 | 4/2005 | Baratuci et al. |

(56) References Cited

U.S. PATENT DOCUMENTS

| | | |
|---|---|---|
| 6,897,169 B2 | 5/2005 | Matsui et al. |
| 6,905,650 B2 | 6/2005 | McIntosh et al. |
| 6,948,287 B2 | 9/2005 | Korn |
| 6,989,188 B2 | 1/2006 | Brunnhofer et al. |
| 6,996,944 B2 | 2/2006 | Shaw |
| 7,043,880 B2 | 5/2006 | Morgan et al. |
| 7,070,653 B2 | 7/2006 | Frost et al. |
| 7,090,224 B2 | 8/2006 | Iguchi et al. |
| 7,101,614 B2 | 9/2006 | Anton et al. |
| 7,114,899 B2 | 10/2006 | Gass et al. |
| 7,210,557 B2 | 5/2007 | Phillips et al. |
| 7,222,460 B2 | 5/2007 | Francies, III et al. |
| 7,225,824 B2 | 6/2007 | West et al. |
| 7,240,905 B1 | 7/2007 | Stahl, Sr. |
| 7,278,450 B1 | 10/2007 | Condon |
| 7,287,738 B2 | 10/2007 | Pitlor |
| 7,441,375 B2 | 10/2008 | Lang |
| 7,621,731 B2 | 11/2009 | Armantrout et al. |
| 7,665,272 B2 | 2/2010 | Reen |
| 7,678,453 B2 | 3/2010 | Ohnstad et al. |
| 7,748,310 B2 | 7/2010 | Kennedy |
| 7,757,450 B2 | 7/2010 | Reyes et al. |
| 7,836,659 B1 | 11/2010 | Barnes |
| 7,856,781 B2 | 12/2010 | Hillburn, Jr. |
| 7,877,958 B2 | 2/2011 | Baratuci et al. |
| 7,941,981 B2 | 5/2011 | Shaw |
| 8,033,073 B1 | 10/2011 | Binder |
| 8,079,190 B2 | 12/2011 | Hillburn, Jr. |
| 8,171,590 B2 | 5/2012 | Kim |
| 8,172,938 B2 | 5/2012 | Alright et al. |
| 8,317,444 B1 | 11/2012 | Hensley |
| 8,333,532 B2 | 12/2012 | Derrigan et al. |
| 8,341,908 B1 | 1/2013 | Hensley et al. |
| 8,365,495 B1 | 2/2013 | Witherspoon |
| 8,397,453 B2 | 3/2013 | Shaw |
| 8,601,760 B2 | 12/2013 | Hilburn, Jr. |
| 8,720,138 B2 | 5/2014 | Hilburn, Jr. |
| 8,739,495 B1 | 6/2014 | Witherspoon |
| 8,813,449 B1 | 8/2014 | Hensley et al. |
| 8,813,450 B1 | 8/2014 | Hensley et al. |
| 9,068,297 B2 | 6/2015 | Hensley et al. |
| 9,200,437 B1 | 12/2015 | Hensley et al. |
| 2002/0052425 A1 | 5/2002 | Kaku et al. |
| 2002/0088192 A1 | 7/2002 | Calixto |
| 2002/0095908 A1 | 7/2002 | Kiser |
| 2002/0113143 A1 | 8/2002 | Frost et al. |
| 2002/0193552 A1 | 12/2002 | Kiuchi et al. |
| 2003/0005657 A1 | 1/2003 | Visser et al. |
| 2003/0110723 A1* | 6/2003 | Baerveldt ............... 52/396.04 |
| 2003/0213211 A1 | 11/2003 | Morgan et al. |
| 2004/0020162 A1 | 2/2004 | Baratuci et al. |
| 2004/0045234 A1 | 3/2004 | Morgan et al. |
| 2004/0101672 A1 | 5/2004 | Anton et al. |
| 2004/0113390 A1 | 6/2004 | Broussard, III |
| 2005/0066600 A1 | 3/2005 | Moulton et al. |
| 2005/0120660 A1 | 6/2005 | Kim et al. |
| 2005/0155305 A1 | 7/2005 | Cosenza et al. |
| 2005/0193660 A1 | 9/2005 | Mead |
| 2005/0222285 A1 | 10/2005 | Massengill et al. |
| 2006/0010817 A1 | 1/2006 | Shull |
| 2006/0030227 A1 | 2/2006 | Hairston et al. |
| 2006/0117692 A1 | 6/2006 | Trout |
| 2006/0178064 A1 | 8/2006 | Balthes et al. |
| 2007/0059516 A1 | 3/2007 | Vincent et al. |
| 2007/0137135 A1 | 6/2007 | Shymkowich |
| 2007/0199267 A1 | 8/2007 | Moor |
| 2007/0261342 A1 | 11/2007 | Cummings |
| 2008/0172967 A1 | 7/2008 | Hilburn |
| 2008/0193738 A1 | 8/2008 | Hensley et al. |
| 2008/0268231 A1 | 10/2008 | Deib |
| 2009/0036561 A1 | 2/2009 | Nygren |
| 2009/0223150 A1 | 9/2009 | Baratuci et al. |
| 2009/0223159 A1 | 9/2009 | Colon |
| 2009/0246498 A1 | 10/2009 | Deiss |
| 2009/0315269 A1 | 12/2009 | Deiss |
| 2010/0058696 A1 | 3/2010 | Mills |
| 2010/0275539 A1 | 11/2010 | Shaw |
| 2010/0281807 A1 | 11/2010 | Bradford |
| 2010/0319287 A1 | 12/2010 | Shaw |
| 2011/0016808 A1 | 1/2011 | Hulburn, Jr. |
| 2011/0083383 A1 | 4/2011 | Hilburn, Jr. |
| 2011/0088342 A1 | 4/2011 | Stahl, Sr. et al. |
| 2011/0135387 A1 | 6/2011 | Derrigan et al. |
| 2011/0247281 A1 | 10/2011 | Pilz et al. |
| 2012/0117900 A1 | 5/2012 | Shaw |
| 2014/0151968 A1 | 6/2014 | Hensley et al. |
| 2014/0219719 A1 | 8/2014 | Hensley et al. |
| 2014/0360118 A1 | 12/2014 | Hensley et al. |

FOREIGN PATENT DOCUMENTS

| | | |
|---|---|---|
| CA | 1259351 A | 9/1989 |
| CA | 1280007 | 2/1991 |
| CA | 2256660 A1 | 2/2000 |
| CA | 2296779 C | 11/2006 |
| CA | 2640007 A1 | 3/2009 |
| DE | 4436280 A1 | 4/1996 |
| DE | 19809973 C1 | 7/1999 |
| DE | 102005054375 A1 | 5/2007 |
| EP | 0976882 A2 | 2/1999 |
| EP | 0942107 A2 | 9/1999 |
| EP | 1118715 A1 | 7/2001 |
| EP | 1118726 A1 | 7/2001 |
| EP | 1540220 | 2/2004 |
| EP | 1540220 B1 | 8/2006 |
| EP | 1983119 A1 | 4/2007 |
| EP | 1983119 B1 | 10/2008 |
| GB | 977929 | 12/1964 |
| GB | 1359734 | 7/1974 |
| GB | 1495721 | 12/1977 |
| GB | 1519795 | 8/1978 |
| GB | 2181093 A | 4/1987 |
| GB | 2251623 A1 | 7/1992 |
| GB | 2359265 A | 8/2001 |
| GB | 2377379 A | 1/2003 |
| JP | 200645950 A | 2/2006 |
| WO | 03006109 A1 | 1/2003 |
| WO | 2007023118 A2 | 3/2007 |
| WO | 2007024246 A1 | 3/2007 |

OTHER PUBLICATIONS

Willseal LLC, Product Data Sheet, Willseal FR-H, Horizontal 2 and 3 hour fire rated seal, labeled Copyright 2013, pp. 1-2.

Schul International Co., LLC., Firejoint 2FR-V, Fire Rated Expansion Joint-2 Hour Fire Rated, labeled Copyright 2012, pp. 1-2.

Willseal LLC, Product Data Sheet, Willseal FR-V, Vertical 2 and 3 hour fire rated seal, labeled Copyright 2013, pp. 1-2.

UL Online Certifications Directory, System No. FF-D-0082, XHBN.FF-D-0082 Joint Systems, Jul. 29, 2013, pp. 1-2.

UL Online Certifications Directory, System No. FF-D-1100, XHBN.FF-D-1100 Joint Systems, Sep. 24, 2012, pp. 1-2.

UL Online Certifications Directory, System No. WW-D-2013, XHBN.WW-D-2013 Joint Systems, May 27, 2004, pp. 1-2.

UL Online Certifications Directory, System No. FF-D-2008, XHBN.FF-D-2008 Joint Systems, Mar. 31, 2003, pp. 1-2.

UL Online Certifications Directory, System No. FF-D-1053, XHBN.FF-D-1053 Joint Systems, Nov. 28, 2007, pp. 1-2.

UL Online Certifications Directory, System No. WW-D-3005, XHBN.WW-D-3005 Joint Systems, Nov. 15, 1999, pp. 1-2.

UL Online Certifications Directory, XHHW.R8196 Fill, Void or Cavity Materials, labeled Copyright 2014, pp. 1.

UL Online Certifications Directory, XHBN.FF-D-0075 Joint Systems, Apr. 30, 2010, pp. 1-2.

UL Online Certifications Directory, System No. FF-D-0075, XHBN.FF-D-0075 Joint Systems, Aug. 21, 2014, pp. 1-2.

UL Online Certifications Directory, XHBN.FF-D-0094 Joint Systems, Sep. 11, 2013, pp. 1-2.

UL Online Certifications Directory, XHBN.FF-D-1121 Joint Systems, Apr. 25, 2013, pp. 1-2.

(56) References Cited

OTHER PUBLICATIONS

UL Online Certifications Directory, System No. FF-D-2006, XHBN.FF-D-2006 Joint Systems, Jun. 28, 2002, pp. 1-3.
Underwriters Laboratories (UK) Ltd., Assessment Report, Project No. 12CA37234, Aug. 24, 2012, pp. 1-20.
Emseal Joint Systems, Ltd., 2 inch Quietjoint—concrete to concrete, Part No. SHH_2_WW_CONC, Mar. 25, 2014, p. 1.
Emseal Joint Systems, Ltd., 2 inch Quietjoint—gypsum to gypsum, Part No. SHH_2_WW_GYP, Mar. 25, 2014, p. 1.
Emseal Joint Systems, Ltd., 2 inch Quietjoint at concrete wall to window, Part No. SHG_2_WW_CONC_TO_GLASS_INSIDE_CORNER, Mar. 25, 2014, p. 1.
Emseal Joint Systems, Ltd., 2 inch Quietjoint at Gypsum Wall to Window, Part No. SHG_2_WW_GL_INSIDE_CORNER_GYP, Mar. 25, 2014, p. 1.
Emseal Joint Systems, Ltd., 2 inch Quietjoint—Concrete to Concrete at Head of Wall, Part No. SHH_2_HW_CONC_INSIDE_CORNER, Mar. 25, 2014, p. 1.
Emseal Joint Systems, Ltd., 2 inch Quietjoint—Gypsum to Concrete at Head of Wall, Part No. SHH_HW_GYP_CONC_INSIDE_CORNER, Mar. 25, 2014, p. 1.
Emseal Joint Systems, Ltd., 2 inch Quietjoint at Wall Partition to Window, Part No. SHG_2_WW_GL_INSIDE_CORNER_WALL_PARTITION_WINDOW, Mar. 25, 2014, p. 1.
Emseal Joint Systems, Ltd., Emshield DFR3 MSDS, last modified Sep. 3, 2014, p. 1.
https://www.google.com/search, seismic colorseal 5130176 "5,130,176", printed on Oct. 12, 2014, p. 1.
http://www.amazon.com, search for emseal 8,739,495, 1-16 of 624 results for emseal 8,739,495, printed on Oct. 13, 2014, pp. 1-5.
http://www.amazon.com/QuietJoint-Acoustic-Partition-Closure-2-sided, QuietJoint Acoustic Partition Closure for 3 inch (75mm) Joint, 10 foot (3m), printed on Sep. 29, 2014, pp. 1-3.
http://www.amazon.com/QuietJoint-Acoustic-Partition-Closure-3-sided, QuietJoint Acoustic Partition Closure for 5/8 inch (15 mm) Joint, 10 foot (3m), printed on Oct. 13, 2014, pp. 1-3.
Illbruck, Illmod 2d, Product Information, 2002, pp. 1-2.
Emseal Joint Systems, Ltd., Laminations as a Build Choice—The Anatomy of Quality in Pre-Compressed Foam Sealants, last modified Jul. 30, 2013, pp. 1-3.
Notification of Transmittal of International Preliminary Report on Patentability in PCT/US14/32212; Mar. 13, 2015; 4 pages.
Snapshot of Office Actions issued in U.S. Appl. No. 13/729,500; printed in 2015; 35 pages.
Snapshot of Office Actions issued in U.S. Appl. No. 14/278,210; printed in 2015; 27 pages.
Snapshot of Office Actions issued in U.S. Appl. No. 12/635,062; printed in 2015; 88 pages.
Snapshot of Office Actions issued in U.S. Appl. No. 13/731,327; printed in 2015; 42 pages.
Snapshot of Office Action issued in U.S. Appl. No. 14/455,398; printed in 2015; 9 pages.
Snapshot of Office Actions issued in U.S. Appl. No. 13/652,021; printed in 2015; 34 pages.
Snapshot of Office Actions issued in U.S. Appl. No. 14/080,960; printed in 2015; 10 pages.
Snapshot of Office Actions issued in U.S. Appl. No. 14/084,930; printed in 2015; 7 pages.
Snapshot of Office Action issued in U.S. Appl. No. 14/229,463; printed in 2015; 20 pages.
Snapshot of Office Action issued in U.S. Appl. No. 14/455,403; printed in 2015; 12 pages.
Snapshot of Office Action issued in U.S. Appl. No. 14/211,694; printed in 2015; 6 pages.
List of several Emseal pending patent applications and patents, and Examiners assigned thereto; Apr. 2015; 2 pages.
Watson Bowman Acme, Wabo Seismic Parking Deck Exp. Joints, Sales Drawing, Feb. 6, 1988, 3 pgs.
Emseal Corp., Horizontal Colorseal Data Sheet, Jun. 1997, 3 pgs.
Emseal Corp., Horizontal Colorseal Beneath Coverplate Product Design Drawing, Oct. 2000, 1 pg.
Emseal Corp., 20H System Data Sheet, Sep. 1996, pp. 1-2.
Watson Bowman Acme, Product Catalog, Feb. 1993, pp. 1-8.
Emseal Joint Systems, Watertight by Design, Buyline 0339, Copyrighted 1996 and marked Jan. 1999, 8 pgs.
Dow Corning, Down Corning 790 Silicone Building Sealant Data Sheet, Copyrighted 1995, 1999, 8 pgs.
Emseal Joint Systems, Sealing Joints in the Building Envelope: Principles, Products & Practices, Copyright date of 1999, 39 pgs.
Emseal Joint Systems, Product Catalog, Copyright date of 1987, 16 pgs.
Emseal Joint Systems, 20H-Compression Seal Comparison, Apr. 12, 1994, 1 pg.
Emseal Joint Systems, Ltd., Emseal Joint Systems, Marketing Brochure, Jan. 1997, 8 pgs.
City of San Diego, CWP Guidelines, Feb. 1992, pp. 1-13.
Snapshot of Office Action issued in U.S. Appl. No. 90/013,395; printed in 2015, 27 pages.
Defendants' Joint Second Amended Preliminary Invalidity Contentions received at MKG Jun. 30, 2015, Appendix A, 7 pgs.
Defendants' Joint Second Amended Preliminary Invalidity Contentions received at MKG Jun. 30, 2015, Appendix B-1, 346 pgs.
Defendants' Joint Second Amended Preliminary Invalidity Contentions received at MKG Jun. 30, 2015, Appendix B-2, 314 pgs.
Defendants' Joint Second Amended Preliminary Invalidity Contentions received at MKG Jun. 30, 2015, Appendix C, 159 pgs.
Defendants' Joint Second Amended Preliminary Invalidity Contentions received at MKG Jun. 30, 2015, Appendix D, 5 pgs.
Defendants' Joint Second Amended Preliminary Invalidity Contentions received at MKG Jun. 30, 2015, 1:14-cv-00358-SM, 27 pgs. total.
Snapshot of Office Action issued in U.S. Appl. No. 90/013,395; printed in 2015, 48 pages.
Snapshot of Office Action issued in U.S. Appl. No. 90/013,428; printed in 2015, 23 pages.
Snapshot of Office Action issued in U.S. Appl. No. 90/013,472; printed in 2015, 22 pages.
Snapshot of Office Action issued in U.S. Appl. No. 90/013,473; printed in 2015, 22 pages.
3M; Fire Barrier CP 25WB+Caulk, Product Data Sheet, Copyright 3M 2001, 4 pages.
Tremco Incorporated, "Firestop Submittal" Data Sheet collections, Certificate of Conformance dated Nov. 2004, 47 pages; publication date unknown from document.
Emseal Joint Systems, Lt., Preformed Sealants and Expansion Joint Systems, May 2002, pp. 1-4.
Emseal Joint System, Ltd., Tech Data DSH System, Jan. 2000, pp. 1-2.
Emseal Joint Systems, Ltd., Emseal CAD.dwg, Oct. 2000, pp. 1-7.
Emseal Joint Systems, Ltd., Installation Instructions: AST & IST Sealant Tapes, Dec. 1998, p. 1.
Emseal Joint Systems, Ltd., Emshield WFR2, Fire-Rated Expansion Joint Product Data, Jun. 2009, pp. 1-2.
Emseal Joint System, Ltd., ½ Inch Colorseal, Binary Seal System Components, document dated Nov. 24, 1992, p. 1.
Lester Hensley, "Where's the Beef in Joint Sealants? Hybrids Hold the Key," Applicator, vol. 23, No. 2, Spring 2001, pp. 1-5.
Emseal Joint Systems, Ltd, Seismic Colorseal, Tech Data, Apr. 1998, pp. 1-2.
Schul International Co., LLC, Sealtite VP Premium Quality Precompressed Joint Sealant for Weather tight, Vapor Permeable, Vertical Applications, Technical Data, dated Oct. 28, 2005, pp. 1-2.
ISO-Chemie GmbH, Product Data Sheet, ISO-Flame Kombi F 120, pp. 1-2, UK-F010514; publication date unknown from document.
Schul International Co., LLC, Seismic Sealtite II, Colorized, Precompressed Joint Sealant for Vertical Applications, Technical Data, dated Sep. 20, 2006, pp. 1-2.
Dow Corning Corporation, Dow Corning 790 Silicone Building Sealant, copyright date 1995, 1999, pp. 1-5.
Emseal Joint Systems, Ltd, Horizontal Colorseal, Tech Data, Nov. 2008, pp. 1-2.

(56) References Cited

OTHER PUBLICATIONS

Emseal Joint Systems, Ltd, Seismic Colorseal, Tech Data, Jul. 2009, pp. 1-2.
Emseal Joint Systems, Ltd, Horizontal Colorseal, Tech Data, Jul. 2009, pp. 1-2.
Emseal Joint Systems, Ltd, Horizontal Colorseal, Tech Data, Jun. 2010, pp. 1-2.
Schul International Co., LLC, Sealtite "B", Pre-compressed Joint Sealant, Premium Quality for Secondary Sealant Applications, Technical Data, dated Oct. 28, 2005, pp. 1-2.
ISO-Chemie GmbH, ISO-Flame Kombi F 120, 2006, German, pp. 1-2.
ISO-Chemie GmbH, Order Confirmation Sheet, dated Apr. 26, 2007, pp. 1-3.
ISO-Flame Kombi F 120, Net Price List, Schul International Co., dated Jun. 27, 2006, pp. 1.
Tremco Illbruck Limited, Compriband Super FR, Fire Rated Acrylic Impregnated Foam Sealant Strip, Issue 3, dated Apr. 12, 2007, pp. 1-2.
Figure 1: The BS 476; Part 20 & EN 1363-1 time temperature curve, pp. 1; publication date unknown from document.
Schul International Co., LLC, Sealtite, Premium Quality Pre-compressed Joint Sealant for Waterproof Vertical Applications, pp. 1; publication date unknown from document.
Schul International Co., LLC, Sealtite 50N, Premium Quality Pre-compressed Joint Sealant for Horizontal Applications, dated Oct. 28, 2005, pp. 1-2.
Will-Seal, Signed, Sealed & Delivered, pp. 1; publication date unknown from document.
Illbruck/USA, Will-Seal 150 Impregnanted Precompressed Expanding Foam Sealant Tape, Spec-Data Sheet, Joint Sealers, dated Nov. 1987, pp. 1-2.
Illbruck, Inc., Will-Seal 250 Impregnanted Precompressed Expanding Foam Sealant Tape, Spec-Data Sheet, Joint Sealers, dated Aug. 1989, pp. 1-2.
U.S. Department of Labor, Material Safety Data Sheet, Identity: Willseal 150/250 and/or E.P.S., date prepared Jul. 21, 1986, pp. 1-2.
Illbruck, TechSpec Division Facade & Roofing Solutions, ALFAS compriband, Mar. 2005, pp. 1-10.
Salamander Industrial Products, Inc., blocoband HF—interior sealant, pp. 1; publication date unknown from document.
Dow Corning Corporation, Dow Corning 790 Silicone Building Sealant, copyright 2000-2005, pp. 1-2.
Grace Fireproofing Products. Monokote Z-146T. 2007, pp. 1-2.
Polyurethane Foam Field Joint Infill Systems, Sep. 23, 2007 (via Snagit), PIH, pp. 1-5.
International Search Report and Written Opinion for PCT/US2014/032212, Aug. 25, 2014, pp. 1-13.
Grunau Illertissen GmbH, Fir-A-Flex, Fire Protection for Linear Gaps in Walls and Ceilings, dated Aug. 1996, pp. 1-4.
UL Standard for Safety for Rests for Fire Resistance of Building Joint Systems, UL 2079, Underwriters Laboratories Inc. (UL); Fourth Edition; dated Oct. 21, 2004.
Emseal "Pre-cured-Caulk-and-Backerblock" Not New, Not Equal to Emseal's Colorseal, Jul. 19, 2012.
Emseal Drawing Part No. 010-0-00-00 dated Dec. 6, 2005.
Emseal Horizontal Colorseal Tech Data, dated Jun. 1997.
Emseal Joint Systems, Drawing SJS-100-CHT-N, Nov. 20, 2007.
Emseal Technical Bulletin, Benchmarks of Performance for High-Movement Acrylic-Impregnated, Precompressed, Foam Sealants when Considering Substitutions, Jul. 3, 2012.
Emseal, Colorseal & Seismic Colorseal, May 1997, Install Data Colorseal & Seismic Colorseal, p. 1-2.
Emseal, Colorseal, Jan. 2000, Colorseal TechData, p. 1-2.
Emseal, Is there a gap in your air barrier wall design?, Jul. 19, 2012.
Manfredi, L. "Thermal Degradation and Fire Resistance of Unsaturated Polyester, Modified Acrylic Resins and their Composites with Natural Fibres"; Science Direct, 2005.
Stein et al., "Chlorinated Paraffins as Effective Low Cost Flame Retardants for Polyethylene"; publication date unknown from document.
DIN 4102, Part 2, Fire Behaviour of Building Materials and Building Components, Sep. 1977.
Emseal Joint Systems, Ltd., Material Safety Data Sheet for AST-HI-ACRYLIC, pp. 1-2, date issued Apr. 2002.
ISO-Chemie, GmbH., Iso-Bloco 600, pp. 1-2, EN-B010706; publication date unknown from document.
ISO-Chemie, GmbH., Iso-Flame Kombi F 120, pp. 1-2., 2006.
Underwriters Laboratories Inc., UL Standard for Safety for Fire Tests of Building Construction and Materials, UL 263, Thirteenth Edition, Apr. 4, 2003, pp. 1-40.
DIN 4102-1, Fire Behaviour of Building Materials and Elements, Part 1, May 1998, pp. 1-33.
DIN 4102-2, Fire Behaviour of Building Materials and Building Components, Part 2, Sep. 1977, pp. 1-11.
DIN 4102-15, Fire Behaviour of Building Materials and Elements, Part 15, May 1990, pp. 1-15.
DIN 18542, Impregnated Cellular Plastics Strips for Sealing External Joints, Jan. 1999, pp. 1-10.
ASTM International, Standard Test Method for Surface Burning Characteristics of Building Materials, Designation: E-84-04, Feb. 2004, pp. 1-19.
Illbruck Bau-Technik GmbH, Illbruck Illmod 600, Jan. 2002, pp. 1-2.
Illbruck Sealant Systems, Inc., Illbruck Willseal 600, 2001, pp. 1-2.
Iso-Chemie GmbH., Iso-Bloco 600, pp. 1-2, publication date unknown from document.
Iso-Chemie GmbH., Iso-Flame Kombi F 120, pp. 1-2, copyright 2001.
Schul International, Co., LLC., Seismic Sealtite II, Colorized, Pre-compressed Joint Sealant for Vertical Applications, Technical Data, 2006, pp. 1-2.
Underwriters Laboratories, Inc., Standard for Safety, Tests for Fire Resistance of Building Joint Systems, UL-2079, Fourth Edition, Dated Oct. 21, 2004, Revisions through and including Jun. 30, 2008, pp. 1-38.
MM Systems Corp., MM DSS Expansion Joint, Dual Seal Self-Expanding Seismic System, Feb. 18, 2008, pp. 1-2.
Order Granting Request for Ex Parte Reexamination for U.S. Pat. No. 8,739,495, Dec. 12, 2014, Control No. 90/013,395, pp. 1-19.
Emseal Joint Systems, Ltd., Fire-Rating of Emseal 20H System, Feb. 17, 1993, p. 1.
C:\WP\SLSMTG\20HDBJ.TBL Apr. 18, 1993, 20H—Description, Benefits, Justification, p. 1.
Order Granting Request for Ex Parte Reexamination for U.S. Pat. No. 8,813,449, Feb. 11, 2015, Control No. 90/013,428, pp. 1-19.
Report on the Filing or Determination of an Action Regarding a Patent or Trademark, Filed Aug. 13, 2014 regarding U.S. Pat. No. 8,739,495, p. 1.
Plastics Flammability Handbook, pp. 52, 59, and 60, 3 pages; publication date unknown from document.
Defendants' Answer, Counterclaims, Affirmative Defenses, and Jury Demand, filed Oct. 3, 2014, 20 pages.
Defendants' Objection to Plaintiffs Partial Motion to Dismiss, filed Nov. 10, 2014, pp. 1-3.
Defendants' Objection to Plaintiffs Motion to Strike Defendants' Tenth Affirmative Defense, filed Nov. 12, 2014, pp. 1-3.
Defendants' Answer, Counterclaims, and Affirmative Defenses to Plaintiffs Consolidated Complaint, filed Dec. 9, 2014, pp. 1-48.
Defendants' Objection to Plaintiff's Partial Motion to Dismiss Count III of Defendants' Counterclaim, filed Jan. 16, 2015, pp. 1-15.
Defendants' Surreply to Plaintiff's Partial Motion to Dismiss Count II of Defendants' Counterclaims., filed Feb. 13, 2015, pp. 1-6.
Joint Claim Construction and Prehearing Statement, filed Mar. 3, 2015, pp. 1-9.
Lester Hensley, "Where's the Beef in Joint Sealants? Hybrids Hold the Key," AWCI's Construction Dimensions, Jan. 2006, 3 pgs.
IsoChemie, Iso-Bloco 600, Correspondence of Jun. 8, 2006, 13 pages.

(56) References Cited

OTHER PUBLICATIONS

Shul International Company, Invoice #18925 to P. J. Spillane, Sep. 14, 2007, 5 pages.
Illbruck Inc., Tested Physical Properties, 1994, 1 page.
Andrea Frangi, Zum Brandverhalten von Holzdecken aus Hohlkasten-elementen; Jun. 1999; 125 pages (English Translation).
Defendants' Joint First Amended Preliminary Invalidity Contentions received at MKG Mar. 17, 2015, 25 pgs. total.
Defendants' Joint First Amended Preliminary Invalidity Contentions received at MKG Mar. 17, 2015, Appendix A, 6 pgs.
Defendants' Joint First Amended Preliminary Invalidity Contentions received at MKG Mar. 17, 2015, Appendix B, 270 pgs.
Defendants' Joint First Amended Preliminary Invalidity Contentions received at MKG Mar. 17, 2015, Appendix B, 376 pgs.
Defendants' Joint First Amended Preliminary Invalidity Contentions received at MKG Mar. 17, 2015, Appendix C, 125 pgs.
Defendants' Joint First Amended Preliminary Invalidity Contentions received at MKG Mar. 17, 2015, Appendix D, 4 pgs.
IBMB, Test Report No. 3263/5362, Jul. 18, 2002, English Translation, 14 pgs.
IBMB, Test Report No. 3263/5362, Jul. 18, 2002, German, 13 pgs.
IBMB, Test Certificate No. 3002/2719, Mar. 22, 2000, English Translation, 14 pgs.
IBMB, Test Certificate No. P-3568/2560-MPA BS, Sep. 30, 2000, English Translation, 22 pgs.
IBMB, Test Certificate No. P-3568/2560-MPA BS, Sep. 30, 2000, German, 14 pgs.
IFT Rosenheim, Evidence of Performance Test Report 105 324691/e U, Apr. 19, 2006, 8 pgs.
www.stifirestop.com, Specified Technologies, Inc., Product Data Sheet, Series ES Elastomeric Sealant, Copyright 2004, pp. 1-4.
www.stifirestop.com, Specified Technologies, Inc., Product Data Sheet, Pensil PEN300 Silicone Sealant, Copyright 2004, pp. 1-4.
Snapshot of Office Action issued in U.S. Appl. No. 14/540,514; printed in 2015, 22 pages.
Snapshot of Office Action issued in U.S. Appl. No. 90/013,428; printed in 2015, 14 pages.
Snapshot of Notice of Allowance issued in U.S. Appl. No. 14/080,960; printed in 2015, 5 pages.
Decision Granting Ex Parte Reexamination on Control No. 90/013,473, May 19, 2015, 13 pages.
U.S. Appl. No. 60/953,703, filed Aug. 3, 2007 underlying U.S. Pat. No. 8,397,453, 24 pages.
Snapshot of Decision Granting Ex-Parte Reexamination issued in U.S. Appl. No. 90/013,472; printed in 2015; 25 pages.
Snapshot of Notice of Allowance issued in U.S. Appl. No. 14/229,463; printed in 2015; 8 pages.
Snapshot of Notice of Allowance issued in U.S. Appl. No. 13/731,327; printed in 2015, 8 pages.
Snapshot of Office Action issued in U.S. Appl. No. 14/211,694; printed in 2015, 14 pages.
Snapshot of Office Action issued in U.S. Appl. No. 13/652,021; printed in 2015, 13 pages.
Snapshot of Office Action issued in U.S. Appl. No. 90/013,511; printed in 2015, 24 pages.
Snapshot of Office Action issued in U.S. Appl. No. 14/278,210; printed in 2015, 11 pages.
2000 Fire Resistance Directory, p. 1012; publication date unknown from document.
Firestop Submittal Package, Fire Resistive Joint Systems—Waterproofing, SpecSeal Firestop Products, Specified Technologies, Inc, Somerville NJ; p. 1-37, publication date unknown from document.
Specified Technologies Inc., Product Data Sheet, Series ES, Elastomeric Sealant, Copyright 2000, p. 1-4.
Specified Technologies Inc., Product Data Sheet, PEN200 Silicone Foam, Copyright 2003, p. 1-2.
ISO-Chemie GmbH, Schul International Co., Order Confirmation, Doc. No. 135652, Customer No. 38012, Date, Apr. 26, 2007, p. 1-3.
Decision Granting Ex Parte Reexamination on Control No. 90/013,565; Sep. 29, 2015, 19 pages.
Snapshot of Notice of Allowance for U.S. Appl. No. 12/635,062; Oct. 9, 2015, 5 pages.
Snapshot of Office Action for 90/013,511; Oct. 23, 2015, 28 pages.
Snapshot of Advisory Action for 90/013,472-90/013,473; Dec. 28, 2015, 13 pages.
Snapshot of Non-Final Office Action for 90/013,428; Jan. 5, 2016, 14 pages.
Snapshot of Non-Final Office Action for 90/013,565; Jan. 8, 2016, 20 pages.
Dow Coming 890 Self-Leveling Silicone Joint Sealant; Dow Coming Corporation; 1996, 1999.
Emseal, BEJS System—Bridge Expansion Joint System, May 26, 2010, 5 pages.
Emseal, Emseal Acrylic Log Home Tape Installation Instructions, Jun. 2011, 1 page.
Snapshot of Notice of Allowance for U.S. Appl. No. 13/652,021; Jan. 8, 2016, 7 pages.
Snapshot of Non-Final Office Action for U.S. Appl. No. 14/084,930; Jan. 12, 2016, 11 pages.
Snapshot of Office Action in Ex Parte Reexamination for 90/013,395; Jan. 20, 2016, 26 pages.
Snapshot of Notice of Intent to Issue Ex Patent Reexamination Certificate for 90/013,472; Feb. 19, 2016, 8 pages.
Snapshot of Final Office Action for 90/013,511; Feb. 26, 2016, 45 pages.
Snapshot of Final Office Action for 90/013,473; Nov. 6, 2015, 38 pages.
ACI 504-R, Guide to Sealing Joint in Concrete Structures, ACI Committee 504, 1997, 44 pages.
Iso-Chemie, ISO BLOCO 600 solukumitiiviste, Finnish language, pp. 1-2; publication date unknown from document.
Iso-Chemie, ISO BLOCO 600, Produktbeskrivelse, Norwegian language, pp. 1-2, publication date unknown from document.
Ashida, Polyurethane and Related Foams, Chapter three: Fundamentals, p. 43, 45. pp. 1-3; publication date unknown from document.
Merritt, Protection against Hazards, Section 3.30-3.31, 1994, pp. 1-4.
Schultz, Fire and Flammability Handbook, p. 363, 1985, pp. 1-3.
Netherlands Standards Institute, Fire resistance tests for non-loadbearing elements—Part 1: Walls, Aug. 1999, NEN-EN 1364-1, pp. 1-32.
Troitzsch, Jurgen, International plastics flammability handbook, 1983, pp. 1-2.
Polytite Manufacturing Company, Polytite "R" Colorized Joint Sealant, Jan. 7, 1998, pp. 1-2.
Quelfire, Passive Fire Protection Products, catalog, pp. 1-68, publication date unknown from document.
Quelfire, Intufoam, pp. 1-4, publication date unknown from document.
Saint-Gobain Performance Plastics, Norseal V740, labeled Copyright 2001, pp. 1-2.
Sandell Manufacturing Company, Inc., Polytite Sealant and Construction Gasket, p. 1, publication date unknown from document.
Schul International Corporation, Hydrostop, Expansion Joint System, Jan. 17, 2001, pp. 1-2.
Illbruck, Sealtite-willseal, Plant Bodenwohr, pp. 1-17, publication date unknown from document.
Schul International Co., LLC., Sealtite "B" Type II, Part of the S3 Sealant System, Jan. 5, 2006, pp. 1-2.
Sealtite-willseal Joint Sealants, Equivalency Chart for Joint Sealants, p. 1, publication date unknown from document.
Schul International Co., LLC., Material Safety Data Sheet, Seismic Sealtite, revised date Oct. 23, 2002, pp. 1-3.
Sealtite-Willseal, Installation Procedures for Seismic Sealtite/250C Joint Sealant, Mar. 4, 2001, p. 1.
Tremco Illbruck Ltd., Technical Data Sheet, ALFASIL FR, Issue 3, pp. 1-2, Oct. 22, 2007.
Product Data Sheet, Art. No. 4.22.01 Compriband MPA, pp. 1-2, publication date unknown from document.
UL Online Certifications Directory, XHBN.GuideInfo, Joint Systems, last updated Sep. 21, 2013, pp. 1-4.

(56) References Cited

OTHER PUBLICATIONS

UL 1715 Fire Test of Interior Finish Material, http://ulstandardsinfonet.ul.com/scopes/1715.html[Oct. 7, 2014 3:27:15 PM], p. 1, publication date unknown from document.
Williams Products, Inc., Williams Everlastic 1715 Fire Classified Closures Tech Data, Oct. 2005, p. 1.
Williams Products, Inc., Everlastic Fire Classifed Closures 1715, http://williamsproducts.net/fire_classified_1715.html [Oct. 7, 2014 3:26:33 PM], pp. 1-3, publication date unknown from document.
Williams Products, Inc., Installation for partion closures, p. 1, publication date unknown from document.
Will-Seal Construction Foams, Will-seal is Tested to Perform, p. 1, publication date unknown from document.
Will-Seal Precompressed Foam Sealant, How Will-Seal Works, p. 1, publication date unknown from document.
Illbruck, Will-Seal, Basis of Acceptance, 3.0 Construction Requirements, Precompressed Foam Sealants, Section 07915, pp. 1-8, publication date unknown from document.
Emseal Joint Systems, Ltd., Emseal Colorseal Tech Data, Jul. 2009, p. 1-2.
Emseal Joint Systems, Ltd., Emseal Colorseal Tech Data, Mar. 2011, p. 1-2.
Emseal Joint Systems, Ltd., Emseal Horizontal Colorseal Tech Data, Aug. 2014, p. 1-2.
Emseal Joint Systems, Ltd., Emseal Seismic Colorseal Tech Data, Oct. 2009, pp. 1-2.
Emseal Joint Systems, Ltd., Emseal Seismic Colorseal Tech Data, Jun. 2010, pp. 1-2.
Emseal Joint Systems, Ltd., Emseal MST, Multi-Use Sealant Tape, Sep. 2008, pp. 1-2.
Emseal Joint Systems, Ltd., Emseal MST, Multi-Use Sealant Tape, Oct. 2013, pp. 1-2.
Emseal Joint Systems, Ltd., Emshield DFR2 System, Tech Data, Sep. 2014, pp. 1-4.
Emseal Joint Systems, Ltd., Emshield DFR2, last modified Sep. 19, 2014, pp. 1-4.
Emseal Joint Systems, Ltd., Emshield DFR3, last modified Sep. 4, 2014, pp. 1-5.
Emseal Joint Systems, Ltd., Emshield WFR2 and WFR3, last modified Sep. 3, 2014, pp. 1-5.
Emseal Joint Systems, Ltd., Colorseal-on-a-reel, last modified Nov. 10, 2014, pp. 1-3.
Emseal Joint Systems, Ltd., Colorseal, last modified Oct. 9, 2014, pp. 1-3.
Emseal GreyFlex Expanding Foam Sealant for Facades, p. 1, publication date unknown from document.
Emseal Joint Systems, Ltd., QuietJoint, Tech Data, Nov. 2012, pp. 1-2.
Emseal Corporation Ltd., Material Safety Data Sheet, QuietJoint, MSDS date May 13, 2014, pp. 1-2.
Emseal Joint Systems, Ltd., QuietJoint CAD Details, last modified Oct. 31, 2014, pp. 1-3.
http://www.emseal.com/products/architectural/QuietJoint/QuietJoint.htm, QuietJoint Mass-Loaded Acoustic Partition Closure, last modified Oct. 9, 2014, pp. 1-4.
http://www.emseal.com/products/architectural/QuietJoint/QuietJoint.htm, QuietJoint Mass-Loaded Acoustic Partition Closure, last modified Jul. 29, 2014, pp. 1-4.
http://www.emseal.com/products/architectural/QuietJoint/QuietJoint.htm, QuietJoint Mass-Loaded Acoustic Partition Closure, No intumescent coating, last modified Sep. 19, 2014, pp. 1-4.
http://williamsproducts.net/wide.html, Everlastic Wide Joint Seal, http://williamsproducts.net/wide.html[Oct. 7, 2014 3:37:39 PM], pp. 1-3, publication date unknown from document.
Baerveldt, Konrad, The Applicator—Dear Tom: Emseal has two EIFS Expansion Joint Answers for you, Jun. 1991, pp. 1-4.
Adolf Wurth GmbH & Co., KG, Elastic Joint Sealing Tape, labeled Copyright 2000-2003, pp. 1-7.
Expanding PU Foam, Technical Data Sheet, Feb. 1997, pp. 1-2.
ASTM International, Designation: E 84-04, Standard Test Method for Surface Burning Characteristics of Building Materials, Feb. 2004, pp. 1-19.
ASTM International, Designation: E 176-07, Standard Terminology of Fire Standards, Oct. 2007, pp. 1-20.
Auburn Manufacturing Company, Auburn Product News, Flame Retardant Silicone Sponge, 2007, p. 1.
British Board of Agrement, Agrement Certificate No. 97/3331, Second Issue, Compriband Super, 2005, pp. 1-4.
British Board of Agrement, Agrement Certificate No. 96/3309, Third Issue, Illmod 600 Sealing Tapes, 2003, pp. 1-8.
Nederland Normalistie-Instituut, Experimental Determination of the Fire Resistance of Elements of Building Construction, NEN 6069, Oct. 1991, English Translation, pp. 1-30.
British Standards Institution, Fire Tests on Building Materials and Structures, BS 476: Part 20: 1987, pp. 1-44.
DIN Deutsches Institut for Normung e.V., DIN 18542, Impregnated Cellular Plastics Strips for Sealing External Joints, Requirements and Testing, Jan. 1999, pp. 1-10.
www.BuildingTalk.com, Emseal Joint Systems, Choosing a Sealant for Building Applications, Hensley. May 21, 2007, pp. 1-6.
Netherlands Organization for Applied Scientific Research (TNO), Determination of the Fire Resistance According to NEN 6069 of Joints in a Wall Sealed with Cocoband 6069 Impregnated Foam Strip, Nov. 1996, pp. 1-19.
DIN Deutsches Institut fur Normung e.V., Fire Behaviour of Building Materials and Elements, Part 1: Classification of Building Materials, Requirements and Testing, DIN 4102-1, May 1998, pp. 1-33.
DIN Deutsches Institut fur Normung e.V., Fire Behaviour of Building Materials and Elements, Overview and Design of Classified Building Materials, Elements and Components, DIN 4102-4, Mar. 1994, pp. 1-144.
Dow Corning Corporation, Dow Corning 790, Silicone Building Sealant, labeled Copyright 2000, pp. 1-6.
Dow Corning Corporation, Dow Corning 790, Silicone Building Sealant, Product Information, labeled Copyright 2000-2004, pp. 1-4.
Dow Corning Corporation, Dow Corning Firestop 400 Acrylic Sealant, 2001, pp. 1-4.
Dow Corning Corporation, Dow Corning Firestop 700 Silicone Sealant, 2001, pp. 1-6.
Emseal Joint Systems, Horizontal Colorseal, Aug. 2000, pp. 1-2.
Emseal Joint Systems, Ltd., Colorseal PC/SA Stick STD/001-0-00-00, 1995, p. 1.
Emseal Joint Systems, Ltd., 20H System, Tech Data, Jun. 1997, pp. 1-2.
Emseal Joint Systems, Ltd., Colorseal, Aug. 2000, pp. 1-2.
Emseal Joint Systems, Ltd., DSH System, Watertight Joint System for Decks, Tech Data, Nov. 2005, pp. 1-2.
Emseal Joint Systems, Ltd., Fire-Rating of Emseal 20H System, Feb. 17, 1993, p. 1-2.
Emseal Joint Systems, Ltd., Preformed Sealants and Expansion Joint Systems, May 2002, pp. 1-4.
Emseal Joint Systems, Ltd., Pre-Formed Sealants and Expansion Joints, Jan. 2002, pp. 1-4.
Emseal Joint Systems, Ltd., Seismic Colorseal, Aug. 2000, pp. 1-2.
Emseal Joint Systems, Ltd., Seismic Colorseal-DS (Double-Sided) Apr. 12, 2007, pp. 1-4.
Environmental Seals, Ltd., Envirograf, Fire Kills: Stop it today with fire stopping products for building gaps and openings, 2004, pp. 1-8.
Fire Retardants, Inc., Fire Barrier CP 25WB+Caulk, labeled Copyright 2002, pp. 1-4.
Illbruck Bau-Produkte GmbH u. CO. KG., willseal firestop, Product Information Joint Sealing Tape for the Fire Protection Joint, Sep. 30, 1995, pp. 1-9.
Illbruck, willseal, The Joint Sealing Tape, 1991, pp. 1-19.
Illbruck, willseal 600, Product Data Sheet, 2001, pp. 1-2.
Material Safety Data Sheet, Wilseal 150/250 and/or E.P.S., Jul. 21, 1986, pp. 1-2.
ISO 066, Technical Datasheet, blocostop F-120, 2002 p. 1.
MM Systems, ejp Expansion Joints, Expanding Impregnated Foam System, internet archive, wayback machine, Nov. 16, 2007, pp. 1-2.

(56) References Cited

OTHER PUBLICATIONS

MM Systems, ejp Expansion Joints, Colorjoint/SIF—Silicone Impregnated Foam System, internet archive, wayback machine, Nov. 16, 2007, pp. 1-2.
MM Systems, ColorJoint/SIF Series, Silicone Seal & Impregnated Expanding Foam, Spec Data, 2007, pp. 1-3.
Norton Performance Plastics Corporation, Norseal V740FR, Flame Retardant, UL Recognized Multi-Purpose Foam Sealant, labeled Copyright 1996, pp. 1-2.
Promat International,Ltd., Promaseal FyreStrip, Seals for Movement Joints in Floors/Walls, labeled Copyright 2006, pp. 1-4.
Promat International, Ltd., Promaseal Guide for Linear Gap Seals and Fire Stopping Systems, Jun. 2008, pp. 1-20.
Promat International, Ltd., Promaseal IBS Foam Strip, Penetration Seals on Floors/Walls, labeled Copyright 2004, pp. 1-6.
Promat International, Ltd., Safety Data Sheet, Promaseal IBS, May 25, 2007, pp. 1-3.
Schul International, Co., LLC., Color Econoseal, Technical Data, Premium Quailty Joint Sealant for Waterproof Vertical and Horizontal Applications, 2005, pp. 1-2.
Schul International, Co., LLC., Sealtite Airstop FR, Air and Sound Infiltration Barrier, labeled Copyright Apr. 1997, p. 1.
Schul International, Co., LLC., Sealtite Standard, Pre-compressed Joint Sealant, High Density, Polyurethane Foam, Waterproofs Vertical Applications, 2007.
DIN 4102-16, Fire Behaviour of Building Materials and Elements, Part 16, May 1998, pp. 1-12.
Schul International Co., LLC., Sealtite VP (600) Technical Data, Premium Quality Pre-compressed Joint Sealant for Weather tight, Vapor Permeable, Vertical Applications, labeled Copyright 1997-2002, pp. 1-2.
Schul International Co., LLC., Seismic Sealtite, Technical Data, Colorized, Pre-compressed Joint Sealant for Vertical Applications, 2005, pp. 1-2.
Schul International Co., LLC., Sealtite 50N, Technical Data, Premium Quality Pre-compressed Joint Sealant for Horizontal Applications, labeled Copyright 2002, pp. 1-2.
Schul International Co., LLC., HydroStop, Expansion Joint System, 2005, pp. 1-2.
Schul International Co., LL., Sealtite, The Most Complete Line of Pre-compressed Sealants, web archive.org, wayback machine, printed 2014, pp. 1-3.
Sealant, Waterproofing & Restoration Institute, Sealants: The Professional Guide, labeled Copyright 1995, Chapter II-Sealants, p. 26, pp. 1-3.
Tremco Illbruck, Cocoband 6069, 2007, p. 1 with English translation.
Tremco Illbruck, Alfacryl FR Intumescent Acrylic, Fire Rated, Emulsion Acrylic, Intumescent Sealant, 2007, pp. 1-2.
Tremco Illbruck, Alfasil FR, Fire Rated, Low Modulus, Neutral Cure Silicone Sealant, 2007, pp. 1-2.
Tremco Illbruck, Compriband 600, Impregnated Joint Sealing Tape, 2007, pp. 1-2.
Tremco Illbruck, Compriband Super FR, Fire Rated Acrylic Impregnated Foam Sealant Strip, 2007, pp. 1-2.
Tremco Illbruck, Ltd., Technical Data Sheet, Compriband Super FR, Issue 2, Oct. 18, 2004, pp. 1-4.
Tremco Illbruck, Ltd., Technical Data Sheet, Compriband Super, Issue 1, Sep. 29, 2004, pp. 1-3.
Illbruck, TechSpec Division Facade & Roofing Solutions, Mar. 2005, pp. 1-10.
Tremco Illbruck, Alfas Bond FR, 2007, pp. 1-2.
Tremco Illbruck, Illmod 600, Jun. 2006, pp. 1-2.
Tremco Illbruck, The Specification Product Range, 2007, pp. 1-36.
Tremco Illbruck, Webbflex B1 PU Foam, Fire Rated Expanding Polyurethane Foam, Sep. 11, 2006, pp. 1-2.
UL Online Certifications Directory, System No. WW-S-0007, XHBN.WW-S-0007, Joint Systems, Dec. 5, 1997, pp. 1-3.
UL Online Certifications Directory, BXUV.GuideInfo, Fire-Resistance Ratings ANSI/UL 263, last updated Jun. 26, 2014, pp. 1-24.
Frangi et al., German language, Zum Brandverhalten von Holzdecken aus Hohlkasten-elementen, Institut fur Baustatik and Konstrucktion, Jun. 1999, pp. 1-130.
ASTM International, Designation: E 1966-01, Standard Test Method for Fire-Resistive Joint Systems, current edition approved Oct. 10, 2001. Published Jan. 2002, pp. 1-15.
www.businesswire.com, Celanese Introduces Mowilith Nano Technology Platform for the Next General of Exterior Coatings, Nurnberg, Germany, May 8, 2007, pp. 1-3.
Illbruck, Willseal firestop applied in the joints of the new Pfalz Theater in Kaiserlautern, pp. 1-2; publication date unknown document.
Dayton Superior Chemical & Cement Products, Marketing Update, Fall 2005, pp. 1-2.
Dow Corning Case Study EU Parliament, Brussels, p. 1; publication date unknown from document.
Dow Corning Silicone Sealants, Dow Corning 790 Silicone Building Sealant, Ultra-low-modulus sealant for new and remedial construction joint sealing applications, labeled Copyright 2000-2005, pp. 1-2.
Dow Corning, John D. Farrell Letter to Emseal USA, Wilford Brewer, reference: Emseal Greyflex, Oct. 4, 1984, p. 1.
Dow Corning letter to Customer, Reference: Sealant Certification for Dow Corning 790 Silicone Building Sealant, p. 1; publication date unknown from document.
Emseal Joint Systems, Ltd., Greyflex & Backerseal Wet Sealant Compatibility Chart, Test Data, Sep. 1991, p. 1.
Emseal Joint Systems, Emseal preformed expanding foam sealant, 07920/MAN, pp. 1-2; publication date unknown from document.
Colorseal by Emseal Specification Sections 07 90 00/ 07 95 00, pp. 1-4, publication date unknown from document.
Emseal Joint Systems, Ltd., Emseal Color-seal, Tech Data, pp. 1-2, publication date unknown from document.
Emseal Joint Systems, Ltd., Emseal Color-Seal, p. 1, publication date unknown from document.
www.emseal.com/products, Horizontal Colorseal by Emseal Expansion Joints and Pre-Compressed Sealants, last modified Sep. 19, 2014.
Horizontal Colorseal by Emseal, Specification Sections 07 90 00/ 07 95 00, pp. 1-4; publication date unknown document.
Emseal Material Safety Data Sheet, Acrylic Loghome Tape, pp. 1-2, issued Apr. 2002.
Seismic Colorseal by Emseal Specification Sections 07 90 00/ 07 95 00, pp. 1-4; publication date unknown from document.
Emseal Joint Systems, Ltd., Summary Guide Specification, p. 1; publication date unknown from document.
Emseal Joint Systems, The complete package for all joint requirements, 1988, pp. 1-6.
Envirograf, Cavity Barriers Fire Seal Range, Technical Data, pp. 1-32; publication date from unknown from document.
web.archive.org, www.envirograf.com, Product 40: Intumescent-Coated Fireproof Sponge (patented), labeled Copyright 2007, pp. 1-2.
web.archive.org, www.envirograf.com, Product 5: Intumescent-Caoted Non-Fibrous Slabs (patented), labeled Copyright Apr. 10, 2007, p. 1.
Afk Yapi Elemanlari, Hannoband-BSB Bg1, Fire prevention tape Flame resistand pursuant to DIN 4102 T1, Technical Data Sheet, pp. 1-4; publication date unknown document.
Hanno Dicht-und Dammsysteme, Hannoband-BG1, High Performance am Bau, German language, 2000, pp. 1-6.
Illbruck, willseal firestop fur die Brandschutz-Fuge, Information,German language, pp. 1-2; publication date unknown from document.
Illbruck Sealant Systems, Cocoband 6069, Productinfomatie, Dutch language, 2003, pp. 1-2.
Illbruck Sealant Systems, Inc., Sealant Products and Systems, 2002, pp. 1-12.
Illbruck, Will-Seal, 3.0 Construction Requirements, pp. 1-8; publication date unknown from document.
Sealtite Joint Sealants, What is the material used in the U-Channel? pp. 1-4; publication date unknown from document.
Snapshot of Office Action for 90/013,428; May 6, 2016, 22 pages.

(56) References Cited

OTHER PUBLICATIONS

Snapshot of Office Action for U.S. Appl. No. 14/950,923; May 6, 2016, 13 pages.
Snapshot of Office Action for U.S. Appl. No. 14/730,896; May 9, 2016, 18 pages.
Snapshot of Office Action for U.S. Appl. No. 14/229,463; May 12, 2016, 14 pages.
Snapshot of Advisory Action for 90/013,511; May 9, 2016, 12 pages.
Snapshot of Ex Parte Reexamination Certificate No. U.S. Pat. No. 6,532,708C2 for 90/013,683; Jun. 7, 2016, 2 pages.
Snapshot of Office Action for U.S. Appl. No. 14/278,210; May 19, 2016, 12 pages.
Snapshot of Office Action for U.S. Appl. No. 14/511,394; May 13, 2016, 6 pages.
Snapshot of Advisory Action for 90/013,395; May 20, 2016, 4 pages.
Snapshot of Office Action for U.S. Appl. No. 13/731,327; Jan. 4, 2017, 6 pages.
Snapshot of Notice of Allowance for U.S. Appl. No. 14/229,463; Jan. 5, 2017, 7 pages.
Snapshot of Notice of Allowance for U.S. Appl. No. 13/731,327; Feb. 10, 2017, 6 pages.
Snapshot of Non-Final Office Action for U.S. Appl. No. 13/731,327; Mar. 18, 2016, 27 pages.
Snapshot of Final Office Action for U.S. Appl. No. 14/211,694; Mar. 21, 2016, 16 pages.
Snapshot of Ex parte Reexamination Certificate No. U.S. Pat. No. 6,532,708C1 for 90/013,472; Mar. 23, 2016, 3 pages.
Snapshot of Intent to Issue Ex Parte Reexamination Certificate for 90/013,395; Oct. 6, 2016, 9 pages.
Snapshot of Intent to Issue Ex Parte Reexamination Certificate for 90/013,565; Oct. 7, 2016, 9 pages.
Snapshot of Intent to Issue Ex Parte Reexamination Certificate for 90/013,428; Oct. 31, 2016, 7 pages.
Snapshot of Ex Parte Reexamination Certificate for 90/013,511; Oct. 31, 2016, 3 pages.
Snapshot of Ex Parte Reexamination Certificate for 90/013,565; Nov. 2, 2016, 3 pages.
Snapshot of Ex Parte Reexamination Certificate for 90/013,428; Nov. 23, 2016, 3 pages.
Snapshot of Notice of Allowance for U.S. Appl. No. 14/540,514; Nov. 25, 2016, 4 pages.
Snapshot of Office Action for U.S. Appl. No. 14/278,210; Nov. 30, 2016, 12 pages.
Snapshot of Advisory Action for 90/013,565; Jul. 19, 2016, 5 pages.
Mercury et al., "On the Decomposition of Synthetic Gibbsite Studied by Neutron Thermodiffractometry", J. Am. Ceram, Soc. 89, (2006), pp. 3728-3733.
Brydon et al., "The Nature of Aluminum Hydroxide-Montmorillonite Complexes", The American Mineralogist, vol. 51, May-Jun. 1966, pp. 875-889.
Huber, Alumina Trihydrate (ATH), A Versatile Pigment for Coatings, Inks, Adhesives, Caulks and Sealants Applications, Dec. 2005, 5 pgs.
Snapshot of Examinees Interview Summary for 90/013,511; Aug. 26, 2016, 9 pages.
Snapshot of Advisory Action for 90/013,428; Sep. 8, 2016, 13 pages.
Snapshot of Advisory Action for 90/013,395; Sep. 14, 2016, 16 pages.
Snapshot of Intent to Issue Ex Parte Reexamination Certificate for 90/013,511; Sep. 21, 2016, 9 pages.
Snapshot of Final Office Action for U.S. Appl. No. 14/540,514; Mar. 31, 2016, 18 pages.
Emseal Corporation, Seismic Colorseal by Emseal, "Last Modified": Aug. 21, 2007, 4 pages.
Emseal Joint Systems, Ltd., Backerseal (Greyflex), Sep. 2001, 2 pages.
Emseal Joint Systems, Ltd., Install Data—Horizontal Colorseal—With Expoxy Adhesive, Jun. 2006, 2 pages.
Snapshot of Office Action for 90/013,395; Apr. 7, 2016, 37 pages.
Snapshot of Office Action for 90/013,565; Apr. 8, 2016, 48 pages.
Emseal Joint Systems, Ltd., BEJS System Tech Data, Mar. 2009, 2 pages.
Emseal's new Universal-90 expansion joints, Buildingtalk, Pro-Talk Ltd., Mar. 27, 2009, 2 pages.
Emseal Joint Systems, Ltd., Emseal Emshield DFR2 System DFR3 System Tech Data, May 2010, 4 pages.
Emseal Seismic Colorseal, Aug. 21, 2007, 4 pages.
Emseal Joint Systems, Ltd., Emseal New Universal 90's Watertight, Factory Fabricated Uptum/Downtum Transition Pieces for Ensuring Continuity of Seal, Aug. 4, 2009, 4 pages.

* cited by examiner

FIRE AND WATER RESISTANT EXPANSION AND SEISMIC JOINT SYSTEM

CROSS REFERENCE TO RELATED APPLICATION

This application is a Continuation Application of U.S. patent application Ser. No. 13/723,605, filed on Dec. 21, 2012, now U.S. Pat. No. 8,813,449 issued, on Aug. 26, 2014, which is a continuation application of and claims priority to U.S. patent application Ser. No. 12/730,354, filed on Mar. 24, 2010, now U.S. Pat. No. 8,341,908, issued on Jan. 1, 2013, which claims the benefit of U.S. Provisional Patent Application No. 61/162,820, filed on Mar. 24, 2009, the contents of each of which are incorporated herein by reference in their entireties and the benefits of each are fully claimed herein.

TECHNICAL FIELD

The present invention relates generally to joint systems and, more particularly, to an expansion and seismic joint system that is fire and water resistant for use in building and construction applications.

BACKGROUND

Building and construction applications in which materials such as concrete, metal, and glass are used typically employ joint systems that accommodate thermal expansion and/or seismic movement of the various materials thereof. These joint systems may be positioned to extend through both the interior and exterior surfaces (e.g., walls, floors, and roofs) of a building or other structure. In the case of an exterior joint in an exterior wall, roof, or floor exposed to external environmental conditions, the joint system may also, to some degree, resist the effects of such conditions. As such, most exterior joints are designed to resist the effects of water. In particular, vertically-oriented exterior joints are designed to resist water in the form of rain, snow, ice, or debris that is driven by wind. Horizontally-oriented joints are designed to resist water in the form of rain, standing water, snow, ice, debris such as sand, and in some circumstances several of these at the same time. Additionally, some horizontal systems may be subjected to pedestrian and/or vehicular traffic and are designed to withstand such traffic.

In the case of interior joints, water tightness aspects are less of an issue than they are in exterior joints, and so products are often designed simply to accommodate building movement. However, interior horizontal joints may also be subject to pedestrian traffic and in some cases vehicular traffic as well. Particularly with regard to joints in horizontal surfaces, cover plates can be fitted over the joints to allow for the smooth movement of traffic over the joint and/or to protect the material of the joint from the effects of the weather.

It has been generally recognized that building joint systems are deficient with respect to fire resistance. In some instances, movement as a result of building joint systems has been shown to create chimney effects which can have consequences with regard to fire containment. This often results in the subversion of fire resistive elements that may be incorporated into the construction of a building. This problem is particularly severe in large high-rise buildings, parking garages, and stadiums where fire may spread too rapidly to allow the structures to be evacuated.

Early designs for fire resistive joints included blocks of mineral wool or other inorganic materials of either monolithic or composite constructions. Field-applied liquid sealants were often used in these joints. In general, these designs were adequate for non-moving joints or control joints where movements were very small. Where movements were larger and the materials were significantly compressed during the normal thermal expansion cycles of the building structure, these designs generally did not function as intended. Indeed, many designs simply lacked the resilience or recovery characteristics for maintaining adequate coverage of the entire joint width throughout the normal thermal cycle (expansion and contraction) that buildings experience. Many of these designs were tested in accordance with accepted standards such as ASTM E-119, which provides for fire exposure testing of building components under static conditions and does not take into account the dynamic nature of expansion joint systems. As described above, this dynamic behavior can contribute to the compromise of the fire resistance properties of some building designs.

Underwriters Laboratories developed UL 2079, a further refinement of ASTM E-119, by adding a cycling regimen to the test. Additionally, UL 2079 stipulates that the design be tested at the maximum joint size. This test is more reflective of real world conditions, and as such, architects and engineers have begun requesting expansion joint products that meet it. Many designs which pass ASTM E-119 without the cycling regime do not pass UL 2079. This may be adequate, as stated above, for non-moving building joints; however, most building expansion joint systems are designed to accommodate some movement as a result of thermal effects (e.g., expansion into the joint and contraction away from the joint) or as a result of seismic movement.

Both expansion joints and fire resistive expansion joints typically address either the water tightness (waterproof or water resistance) aspects of the expansion joint system or the fire resistive nature of the expansion joint system, as described above, but not both.

Water tight expansion joints exist in many forms, but in general they are constructed from materials designed to resist water penetration during the mechanical cycling caused by movement of the building due to thermal effects. These designs generally do not have fire resistant properties in a sufficient fashion to meet even the lowest fire rating standards. Indeed, many waterproofing materials act as fuel for any fire present, which can lead to a chimney effect that rapidly spreads fire throughout a building.

Conversely, many fire rated expansion joints are not sufficiently water tight to render them suitable for exterior applications. Many designs reliant upon mineral wool, ceramic materials and blankets, and intumescents, alone or in combination with each other, have compromised fire resistance by coming into contact with water. Additionally, as noted above, many fire rated designs cannot accommodate the mechanical cycling due to thermal effects without compromising the fire resistance.

This has resulted in the installation of two systems for each expansion joint where both a fire rating and water resistance is desired. In many cases, there simply is not sufficient room in the physical space occupied by the expansion joint to accommodate both a fire rated system and a system capable of providing waterproofing or water resistance. In instances where the physical accommodation can be made, the resultant installation involves two products, with each product involving its own crew of trained installers. Care is exercised such that one installation does not compromise the other.

Many systems also employ on-site assembly to create a finished expansion joint system. This is arguably another weakness, as an incorrectly installed or constructed system may compromise fire and water resistance properties. In some cases, these fire resistant expansion joint systems do not employ cover plates and are instead invasively anchored to the concrete substrate. Over time, the points at which such systems are anchored are subject to cracking and ultimately spalling, which may subvert the effectiveness of the fire resistance by simply allowing the fire to go around the fire resistant elements of the system. Without cover plates over the joints, fire in these cases would not be contained within the joints.

Also, many expansion joint products do not fully consider the irregular nature of building expansion joints. It is quite common for an expansion joint to have several transition areas along its length. These may be walls, parapets, columns or other obstructions. As such, the expansion joint product, in some fashion or other, follows the joint. In many products, this is a point of weakness, as the homogeneous nature of the product is interrupted. Methods of handling these transitions include stitching, gluing, and welding. All of these are weak spots from both a water proofing aspect and a fire resistance aspect.

SUMMARY OF THE INVENTION

As used herein, the term "waterproof" means that the flow of water is prevented, the term "water resistant" means that the flow of water is inhibited, and the term "fire resistant" means that the spread of fire is inhibited.

In one aspect, the present invention resides in an expansion joint system having a cover plate; a spline attached to the cover plate along a first edge of the spline; and two portions of open celled foam, each portion being located on an opposing face of the spline. The open celled foam has a fire-retardant material infused therein and layers of waterproof elastomer disposed thereon. The spline depends from the cover plate and is positioned in a gap between substantially coplanar substrates such that the cover plate covers the gap. Each portion of the open celled foam is compressed between a respective face of the spline and a face of one of the coplanar substrates. An intumescent material may be incorporated into the spline.

In another aspect, the present invention resides in an expansion joint system having a cover plate; a spline attached to the cover plate, the spline having an I-shaped cross section and comprising a vertical element, a first horizontally-oriented flange located at one end of the vertical element, and a second horizontally-oriented flange located at an opposing end of the vertical element; and open celled foam located on each side of the vertical element of the spline. The open celled foam has a fire-retardant material infused therein and layers of waterproof elastomer disposed thereon. The spline depends from the cover plate and is positioned in a gap between substantially coplanar substrates such that the cover plate covers the gap. Each portion of the open celled foam is compressed between a respective side of the vertical element of the spline and a face of one of the coplanar substrates.

In another aspect, the present invention resides in an expansion joint system having a cover plate; a spline attached to the cover plate, the spline comprising two vertical elements each having a horizontally-oriented flange, the vertical elements being arranged back-to-back, and the horizontally-oriented flanges being attached to the cover plate; and open celled foam located on each side of the spline. The open celled foam has a fire-retardant material infused therein and layers of waterproof elastomer disposed thereon. The spline depends from the cover plate and is positioned in a gap between substantially coplanar substrates such that the cover plate covers the gap. Each portion of the open celled foam is compressed between a respective side of the spline and a face of one of the coplanar substrates.

In the foregoing expansion joint systems, the elastomer material is cured and provides for water tightness (waterproofing and/or water resistance), the intumescent material (if present) is cured to provide for fire resistance, and the fire retardant infused open celled foam provides for both fire resistance and movement properties. These materials can be assembled and arranged so as to offer water tightness in one direction and fire resistance in the other (an asymmetrical configuration), or in a fashion that offers both water tightness and fire resistance in both directions (a symmetrical configuration) through a building joint. The system is delivered to the job site in a pre-compressed state ready for installation into the joint.

DETAILED DESCRIPTION OF THE INVENTION

The expansion joint systems described herein can be understood by referring to the attached drawings and also to U.S. Pat. No. 6,532,708, which is incorporated by reference herein. One embodiment of an expansion joint system as described herein is installed between concrete substrates to define a concrete expansion joint system capable of accommodating movement of the concrete substrates due to thermal effects and/or seismic effects. The present invention is not limited in this regard, however, as the expansion joint system may be installed between substrates or surfaces other than concrete. Materials for such substrates or surfaces include, but are not limited to, glass, asphalt, stone (granite, marble, etc.), and the like. Furthermore, the expansion joint systems described herein are generally referred to as being horizontally oriented; however, the present invention is not limited in this regard, as the joint systems (with or without cover plates) can also be installed vertically.

Figure 1:
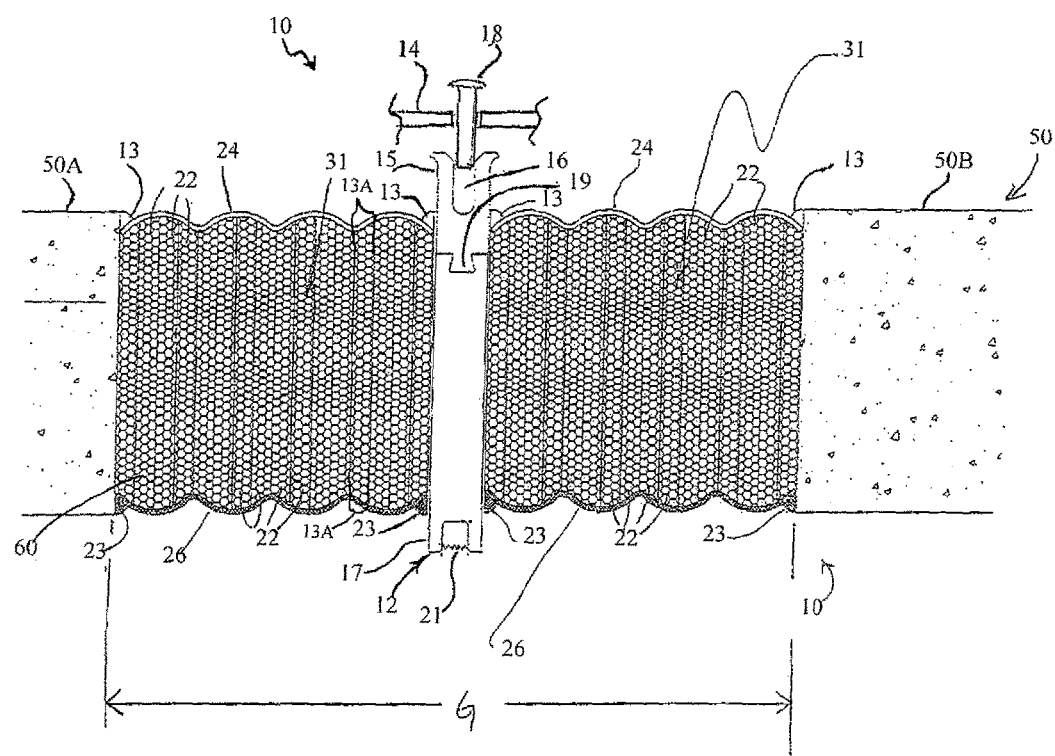
FIG. 1 is a schematic view of one embodiment of an expansion joint system of the present invention.

Referring to FIG. 1, one embodiment of an expansion joint system is shown at 10 and is hereinafter referred to as "system 10." In system 10, a spline 12 is located between horizontally-oriented concrete substrates 50, two substrates 50A and 50B being shown. The spline 12 can be positioned between concrete substrates 50 via the use of a cover plate 14 that is located over and spans a gap G between the concrete substrates 50 such that the spline extends substantially vertically into the gap G. Fasteners 18 are used secure the cover plate 14 to the spline 12.

The spline 12 can comprise one or more pieces. In a one-piece or "monolithic" configuration, the spline 12 comprises a suitable material such as graphite or a plastic (e.g., polycarbonate, acrylic, polyvinyl chloride, or the like) or any other material. While in some instances it is preferable that the spline material is non-electrically conductive, the present invention is not limited in this regard, as a monolithic spline 12 could be metal or an alloy of two or more metals.

In a two-piece or multi-piece configuration, the spline 12 may comprise different materials that are suitable for the application at hand. For example, in an application where increased rigidity is desired, the spline 12 may be comprised of a first piece fabricated or formed from a metal and joined edge-to-edge with a second piece fabricated or formed from the non-conductive material. Metals that may be used for the spline 12 include, but are not limited to, aluminum, steel (e.g., stainless steel), and the like.

In one embodiment of a two-piece spline 12, an upper portion 15 includes holes 16, channels, or similar structure to receive the fasteners 18. The upper portion 15 is an aluminum bar or rail having holes 16 located in an upper end in which the fasteners 18 are received. A lower end of the upper portion 15 includes a protrusion 19 that enables the upper portion to connect to a corresponding slot or the like in a lower portion 17 of the spline 12 in a dovetail-type fitting. The present invention is not limited in this regard, as the upper portion 15 can be connected to the lower portion 17 using any suitable means. The lower portion 17 is preferably fabricated of the non-conductive plastic or similar material. A channel is located in a bottom end of the lower portion, and an intumescent material 21 is located therein. The spline 12 is not limited to the use of metal upper portions 15 and non-conductive lower portions 17, as other materials are within the scope of the present invention.

Whether the spline 12 is monolithic or constructed of multiple pieces, laminations of open celled polyurethane foam 22 (hereinafter referred to as "foam 22") are arranged to form laminates 31, which are located on both sides of the spline 12 and are compressed in the gap G between the concrete substrates 50. The present invention is not limited to the use of polyurethane foams, as other foams are within the scope of the present invention. The individual laminations 13A are layers that extend parallel and in the direction in which the joint extends and along the length thereof and are constructed by infusing each lamination with an amount of fire retardant material 60. However, the structures of the present invention are also not limited in this regard, as the foam may comprise a block of foam of fixed size depending upon the desired joint size, a laminate comprising laminations oriented perpendicular to the direction in which the joint extends, or combinations of the foregoing.

Because the amounts of foam 22 that are located on either side of the spline 12 are substantially equal and subject to substantially the same environmental conditions, the force of the compressed foam as it expands on one side of the spline 12 is substantially equal to the force of the compressed foam exerted on the other side of the spline. Thus, once installed, the system 10 is generally in equilibrium, and the spline 12 is self-centering within the gap between the concrete substrates 50. The cover plate 14, which overlies the gap between the substrates 50 and generally completely covers the gap, is preferably centered with respect to the spline 12.

Each lamination of the foam 22 may be infused with a water-based aluminum tri-hydrate fire retardant material 60 to form the defined expansion joint. The amount of fire retardant material 60 is between 3.5:1 and 4:1 in ratio with the un-infused foam itself. The resultant uncompressed laminate has a density of approximately 140 kg/m$^3$.

In the system 10, several laminations, the number depending on the desired size of the expansion joint, are compiled and then compressed. The spline 12 is placed on an end surface of the compiled laminations, and several additional laminations are compiled and placed on the spline and compressed. The entire foam/spline/foam assembly is held at compression in a suitable fixture. The fixture is at a width slightly greater than that which the expansion joint is anticipated to experience at the largest possible movement of the adjacent concrete surfaces. At this width, the infused foam laminate is coated with a waterproof elastomer 24 at one surface (e.g., on the top side). This waterproof elastomer may be a polysulfide, silicone, acrylic, polyurethane, polyepoxide, silyl-terminated polyether, a formulation of one or more of the foregoing materials with or without other elastomeric components or similar suitable elastomeric coating or liquid sealant materials, or a mixture, blend, or other formulation of one or more of the foregoing. One preferred elastomer coating for application to a horizontal deck where vehicular traffic is expected is Pecora 301, which is a silicone pavement sealant available from Pecora Corporation of Harleysville, Pa. Another preferred elastomeric coating is Dow Corning 888, which is a silicone joint sealant available from Dow Corning Corporation of Midland, Mich. Both of the foregoing elastomers are traffic grade rated sealants. For vertically-oriented expansion joints, exemplary preferred elastomer coatings include Pecora 890, Dow Corning 790, and Dow Corning 795.

Depending on the nature of the adhesive characteristics of the elastomer 24, a primer may be applied to the outer surfaces of the laminations of foam 22 prior to the coating with the elastomer. Applying such a primer may facilitate the adhesion of the elastomer 24 to the foam 22.

The elastomer 24 is tooled to create a "bellows" profile (or a similar profile) such that the elastomeric material can be compressed in a uniform and aesthetic fashion while being maintained in a virtually tensionless environment.

The surface of the laminate 31 opposite the surface coated with the waterproofing elastomer 24 (the bottom side) is coated with an intumescent material 26. One preferred intumescent material 26 is 3M CP25WB+, which is a fire barrier caulk. Both the coating of the elastomer 24 and the intumescent material 26 are cured in place on the foam 22 while the infused foam lamination is held at the prescribed compressed width. After the elastomer 24 and the intumescent material 26 have been cured, the entire foam composite and spline assembly is removed from the fixture, optionally compressed to less than the nominal size of the material, and packaged for shipment to the job site. This first embodiment is suited to horizontal parking deck applications where waterproofing is desired on the top side and fire resistance is desired from beneath.

In this system 10, a sealant band and/or corner bead 13 of the elastomer 24 can be applied on the side(s) of the interface between the foam laminate and the concrete substrate 50 to create a water tight seal. On the opposite side, a sealant band and/or corner bead 23 of the intumescent material 16 can be similarly applied to create a homogeneous intumescent face on the fire resistant side.

Figure 2:
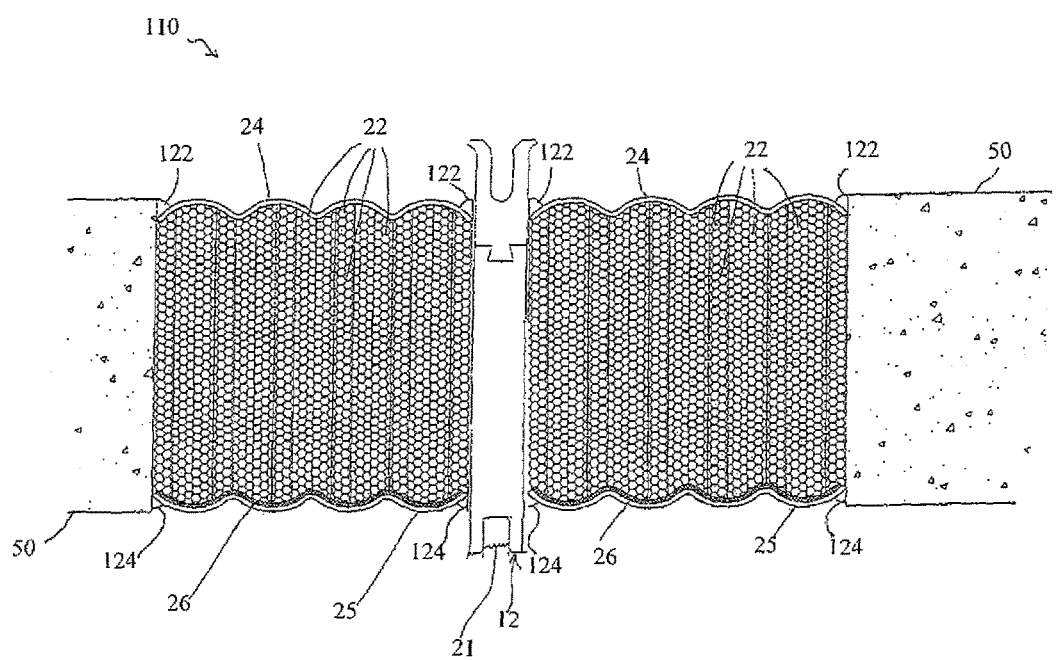
FIG. 2 is a schematic view of another embodiment of an expansion joint system of the present invention.

Referring now to FIG. 2, an alternate expansion joint system 110 of the present invention includes two portions of foam 22 disposed on either side of the spline 12. The spline 12 may be monolithic or constructed of multiple pieces. The foam 22 has a first elastomer 24 coated on one surface (e.g., the top side) and the intumescent material 26 coated on an opposing surface (e.g., the bottom side). A second elastomer 25 is coated on the intumescent material 26 and provides a waterproofing function. In this manner, the system 110 is water resistant in both directions and fire resistant in one direction. The system 110 is used in applications that are similar to the applications in which the system 10 is used, but may be used where water is present on the underside of the expansion joint. Additionally, system 10 would be suitable for vertical expansion joints where waterproofing or water resistance is desirable in both directions while fire resistance is desired in only one direction. The second elastomer 25 may also serve to aesthetically integrate the system 110 with surrounding substrate material.

Sealant bands and/or corner beads 122 of the first elastomer 24 can be applied to the sides as with the embodiment described above. On the opposite side, a band or bead of the intumescent material 26 can be applied between the concrete substrate 50 and the foam lamination with any excess being removed. Sealant bands and/or corner beads 124 can be applied on top of the second elastomer 25, thereby creating a water tight seal between the concrete substrate 50 and the intumescent material.

Figure 3:
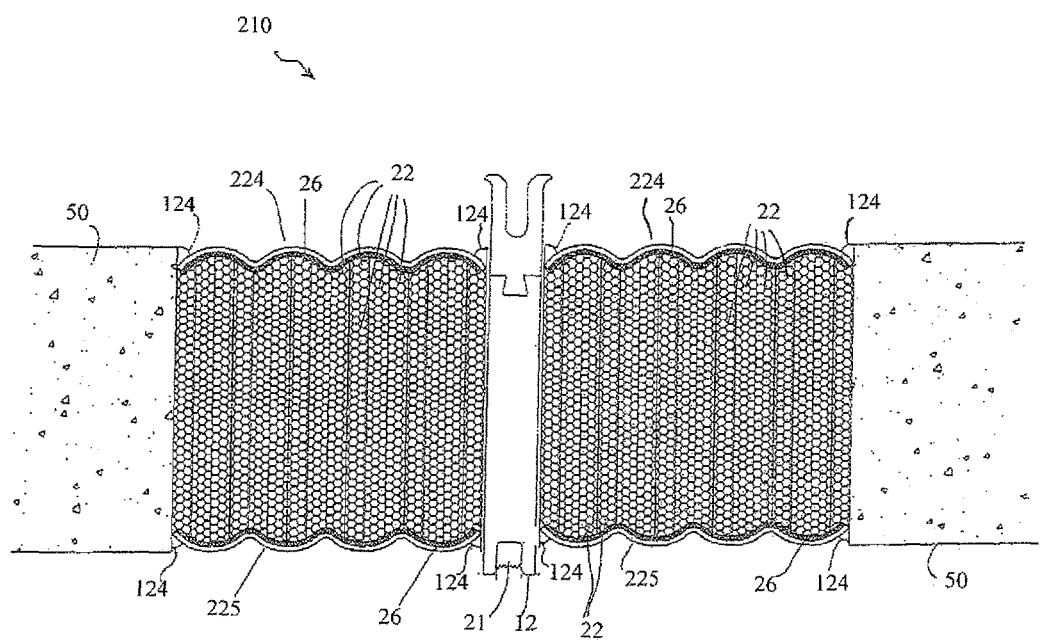
FIG. 3 is a schematic view of another embodiment of an expansion joint system of the present invention.

Referring now to FIG. 3, another expansion joint system of the present invention is shown at 210. In system 210, the foam 22 is located on either side of the spline 12, which may be monolithic or constructed of multiple pieces. The foam 22 is similar to or the same as the above-described foam, but both exposed surfaces (the top and bottom sides) are coated first with the intumescent material 26 to define a first coating of the intumescent material on the top side and a second coating of the intumescent material 26 on the bottom side. The first coating of the intumescent material 26 is coated with a first elastomer material 224, and the second coating of the intumescent material 26 is coated with a second elastomer material 225. This system 210 can be used in the same environments as the above-described systems with the added benefit that it is both waterproof or at least water resistant and fire resistant in both directions through the joint. This makes it especially suitable for vertical joints in either interior or exterior applications.

In system 210, sealant bands and/or corner beads of the intumescent material and sealant bands and/or corner beads 124 of the elastomer are applied in a similar fashion as described above and on both sides of the foam 22. This creates homogeneous intumescent layers and a water tight elastomer layer above them on both sides of the foam 22 (on the top side and the bottom side).

Figure 4:
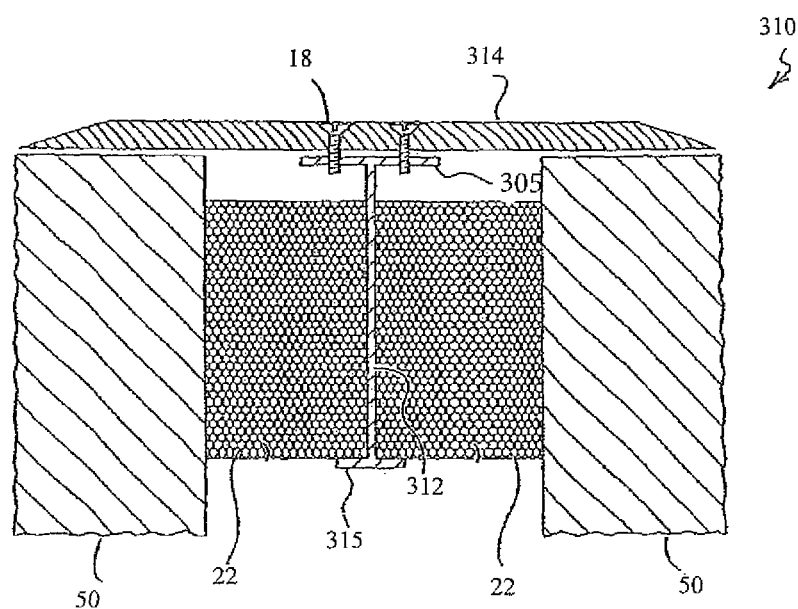
FIG. 4 is a schematic view of another embodiment of an expansion joint system of the present invention.

Referring now to FIG. 4, another embodiment of the expansion joint system is shown at 310 and is hereinafter referred to as "system 310." System 310 includes a spline 312 (similar to spline 5 of the aforementioned U.S. Pat. No. 6,532,708 (FIG. 4)), which is a monolithic element having an I-shaped cross section defined by a vertical member and two horizontally oriented flanges located at either end thereof. Spline 312 provides for both the cover plate anchor and the self-centering mechanism. The present invention is not limited in this regard, however, as the spline 312 may be constructed of multiple pieces. Flanges 305 on the upper end of the spline 312 enable the cover plate 314 to be located on the spline and secured thereto using any suitable fastener 18 (e.g., a screw). The vertical leg of the spline 312 extends into the gap between the concrete substrates 50, and the length thereof depends upon the joint dimensions and the size of the foam 22 located on either side of the spline 312. The foam 22 can be defined by any configuration of waterproofing elastomer, intumescent material, and beads as described above. Flanges 315 located on the bottom end of the spline 312 support the foam 22 and facilitate the retaining of the foam in the gap.

Figure 5:
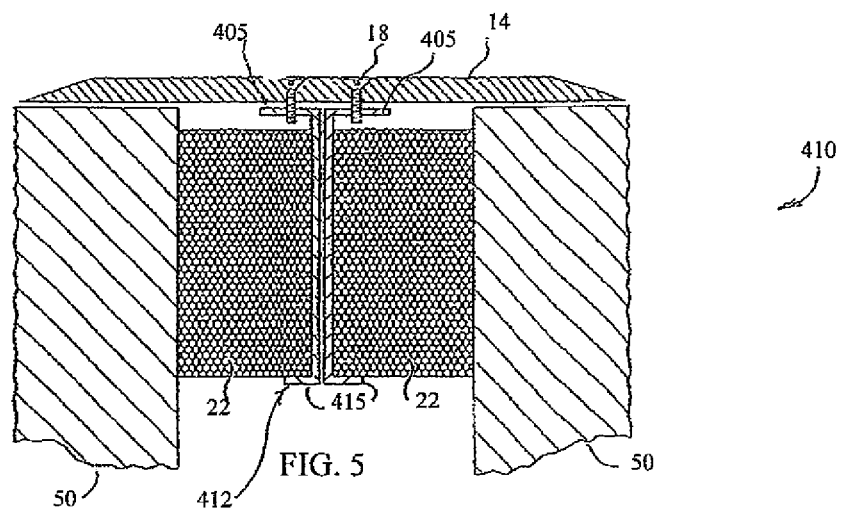
FIG. 5 is a schematic view of another embodiment of an expansion joint system of the present invention.

Referring now to FIG. 5, another embodiment of the expansion joint system is shown at 410 and is hereinafter referred to as "system 410." System 410 compensates for irregularities in joint construction with regard to both horizontal and vertical joint parameters. In other words, the opposing sides of a joint may not be parallel or equidistant from each other. In such a case, the expansion of the foam 22 incorporated into the joint on one side of the spline 412 may not reflect the same expansion characteristics of the foam on the other side of the spline due to irregularities in width of the gap and/or vertical/horizontal alignment of concrete substrates 50.

In system 410, the spline 412 (which is similar to spline of the aforementioned U.S. Pat. No. 6,532,708 (FIG. 5)) comprises two vertical elements positioned back-to-back, each including a top flange 405 and a bottom flange 415. The top flanges 405 are each connected to the cover plate 14 via fasteners 18. The bottom flanges 415 facilitate the support of the foam 22 against the respective vertical element of the spline 412 and the concrete substrate 50. Each top flange 405 can be individually tensioned to the cover plate 14 to allow the portions of foam 22 on either side of the spline 412 to be adjusted independently so as to enable the foam to rest in the joint in the desired manner. Again, the foam 22 can be defined by any configuration of waterproofing elastomer, intumescent material, and beads as described above.

Figure 6:
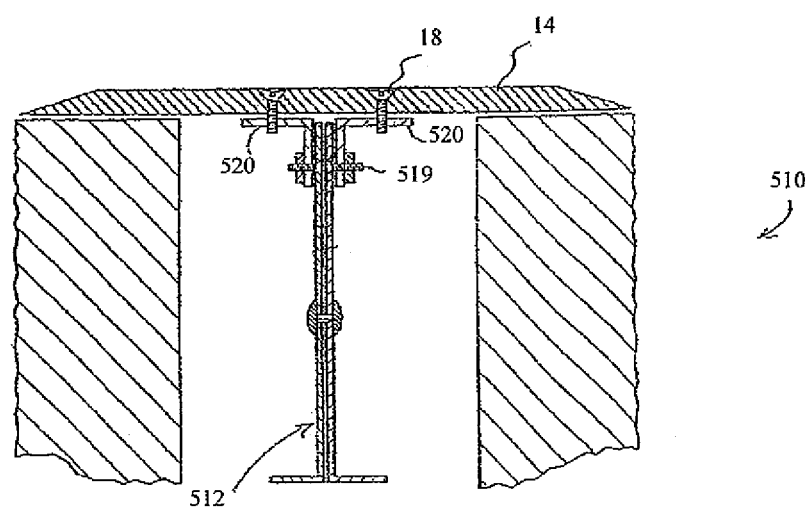
FIG. 6 is a schematic view of another embodiment of an expansion joint system of the present invention.

A system 510 as shown in FIG. 6 comprises a means to adjust the final position of the cover plate 14 relative to vertical elements of a spline 512 (which is similar to spline of aforementioned U.S. Pat. No. 6,532,708 (FIG. 6)). The means to adjust the cover plate 14 is below the cover plate and comprises a bolt 519 or similar mechanism that extends laterally through both vertical elements of the spline 512 and also through vertical portions of angulated flanges 520 attached to upper ends of the spline. Horizontal portions of the angulated flanges 520 are in turn attached to the cover plate 14 using fasteners 18. The angulated portions 520 are adjustable relative to the vertical portions of the spline 512 by means of vertically-extending slots in the vertical portions and/or the angulated portions themselves, through which the bolt 519 extends, thus allowing each angulated portion to be adjusted and secured to accommodate the foam 22 and the cover plate 14 to suitably retain the foam 22. The foam 22 is not shown in system 510, but it can be defined by any configuration of waterproofing elastomer, intumescent material, and beads as described above.

In each of the embodiments described herein, the infused foam laminate is constructed in a manner such that the density of fire retardant is consistent in the foam 22 regardless of the final size of the product. The starting density of the infused foam is approximately 140 kg/m$^3$. After compression, the infused foam density is in the range of 200-700 kg/m$^3$. After installation the laminate will cycle between densities of approximately 750 kg/m$^3$ at the smallest size of the expansion joint to approximately 400-450 kg/m$^3$ (or less) at the maximum size of the joint. This density of 400-450 kg/m$^3$ was determined through experimentation, as a reasonable minimum which still affords adequate fire retardant capacity, such that the resultant foam can pass the UL 2079 test program. The present invention is not limited to cycling in the foregoing ranges, however, and the foam may attain densities outside of the herein-described ranges.

In expansion joint systems employing any of the systems as described herein, installation is accomplished by adhering the foam laminate to the concrete substrate 50 using an adhesive such as epoxy. The epoxy or other adhesive is applied to the faces of the expansion joint prior to removing the foam/spline/foam assembly from the packaging thereof (such packaging may comprise restraining elements, straps, ties, bands, shrink wrap plastic, or the like). Once the packaging has been removed, the foam laminate will begin to expand, and it should be inserted into the joint in the desired orientation. Once the foam lamination has expanded to suit the expansion joint, it will become locked in by the combination of the foam back pressure and the adhesive. If a cover plate is installed, the cover plate can further facilitate the retention of the foam lamination in place in the joint.

In vertical expansion joint systems employing any of the systems as described herein, an adhesive may be pre-applied to the foam/spline/foam assembly. In this case, for installation, the assembled foam laminate and spline with the pre-applied adhesive is removed from the packaging and inserted into the space between the concrete surfaces to be joined where it is allowed to expand to meet the concrete substrate. Once this is done, the adhesive in combination with the back pressure of the foam will hold the foam in position. The cover plate can then be attached to the spline.

To fill an entire expansion joint, the installation as described above is repeated as needed. To join the end of one foam laminate to the end of another in either the horizontal configuration or the vertical configuration, a technique similar to that used with the sealant band and/or corner beads can be employed. After inserting one section of a system (joint) and adhering it securely to the concrete substrate, the next section is readied by placing it in proximity to the first section. A band or bead of the intumescent material and the elastomer material is applied on the end of the foam laminate in the appropriate locations. The next section is removed from the packaging and allowed to expand in close proximity to the previously installed section. When the expansion has taken place and the section is beginning to adhere to the substrates (joint faces), the section is firmly seated against the previously installed section. The outside faces are then tooled to create an aesthetically pleasing seamless interface.

The above mentioned installation procedure is simple, rapid, and has no invasive elements which impinge upon or penetrate the concrete (or other) substrates. This avoids many of the long term problems associated with invasive anchoring of screws into expansion joint faces.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A fire and water resistant expansion joint system, comprising:
   a cover plate;
   a spline attached to the cover plate;
   foam having a fire retardant material infused therein located on a first face and a second face of the spline;
   wherein the spline depends from the cover plate and is configured to be positioned in a gap between substrates such that the cover plate overlies the gap; and
   wherein the foam is compressible between the first face of the spline and one of the substrates and the foam is compressible between the second face of the spline and the other of the substrates, wherein the fire retardant infused foam has a density when compressed in a range of about 200 kg/m$^3$ to about 700 kg/m$^3$, and the fire and water resistant expansion joint system and the fire retardant infused foam are capable of withstanding exposure to a temperature of about 540° C. at about five minutes, and are configured to pass testing mandated by UL 2079.

2. The expansion joint system of claim 1, wherein a ratio of fire retardant material infused into the first foam and the second foam is in a range of about 3.5:1 to about 4:1.

3. The expansion joint system of claim 2, wherein the fire retardant material infused into the foam comprises aluminum tri-hydrate.

4. The expansion joint system of claim 1, wherein the foam comprises a plurality of laminations into which the fire retardant material is infused.

5. The expansion joint system of claim 1, wherein the foam comprises a block of foam.

6. The expansion joint system of claim 5, wherein the spline is of monolithic construction.

7. The expansion joint system of claim 1, comprising a layer of elastomer on the foam.

8. The fire and water resistant expansion joint system of claim 1, wherein the fire and water resistant expansion joint system and the fire retardant infused foam are capable of withstanding exposure to a temperature of about 930° C. at about one hour.

9. The fire and water resistant expansion joint system of claim 1, wherein the fire and water resistant expansion joint system and the fire retardant infused foam are capable of withstanding exposure to a temperature of about 1010° C. at about two hours.

10. The fire and water resistant expansion joint system of claim 1, wherein the fire and water resistant expansion joint system and the fire retardant infused foam are capable of withstanding exposure to a temperature of about 1260° C. at about eight hours.

11. A fire and water resistant expansion joint system, comprising:
   a cover plate;
   a spline attached to the cover plate;
   foam having a fire retardant material infused therein located on a first face and a second face of the spline;
   wherein the spline depends from the cover plate and is configured to be positioned in a gap between substrates such that the cover plate overlies the gap; and
   wherein the foam is compressible between the first face of the spline and one of the substrates and the foam is compressible between the second face of the spline and the other of the substrates, wherein the fire retardant infused foam has a density when compressed in a range of about 200 kg/m$^3$ to about 700 kg/m$^3$, and the fire and water resistant expansion joint system and the fire retardant infused foam are configured to maintain fire resistance at a temperature of about 540° C. at about five minutes, and are configured to pass testing mandated by UL 2079.

12. The fire and water resistant expansion joint system of claim 1, wherein the fire and water resistant expansion joint system and the fire retardant infused foam are capable of withstanding exposure to a temperature of about 1052° C. at about three hours.

13. The fire and water resistant expansion joint system of claim 1, wherein the fire and water resistant expansion joint system and the fire retardant infused foam are capable of withstanding exposure to a temperature of about 1093° C. at about four hours.

14. The expansion joint system of claim 11, wherein the system and the fire retardant infused foam are configured to maintain fire resistance at a temperature of about 930° C. at about one hour.

15. The expansion joint system of claim 11, wherein the system and the fire retardant infused foam are configured to maintain fire resistance at a temperature of about 1010° C. at about two hours.

16. The expansion joint system of claim 11, wherein the system and the fire retardant infused foam are configured to maintain fire resistance at a temperature of about 1052° C. at about three hour.

17. The expansion joint system of claim 11, wherein the system and the fire retardant infused foam are configured to maintain fire resistance at a temperature of about 1093° C. at about four hours.

18. The expansion joint system of claim 11, wherein the system and the fire retardant infused foam are configured to maintain fire resistance at a temperature of about 1260° C. at about eight hours.

* * * * *